US010688396B2

(12) United States Patent
Osman

(10) Patent No.: US 10,688,396 B2
(45) Date of Patent: Jun. 23, 2020

(54) SECOND SCREEN VIRTUAL WINDOW INTO VR ENVIRONMENT

(71) Applicant: Sony Interactive Entertainment Inc., Tokyo (JP)

(72) Inventor: Steven Osman, San Francisco, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 15/963,047

(22) Filed: Apr. 25, 2018

(65) Prior Publication Data

US 2018/0311585 A1 Nov. 1, 2018

Related U.S. Application Data

(60) Provisional application No. 62/492,100, filed on Apr. 28, 2017.

(51) Int. Cl.
*A63F 9/24* (2006.01)
*A63F 11/00* (2006.01)
(Continued)

(52) U.S. Cl.
CPC .......... *A63F 13/655* (2014.09); *A63F 13/211* (2014.09); *A63F 13/212* (2014.09);
(Continued)

(58) Field of Classification Search
USPC ................ 463/1, 20, 22, 25, 30, 32, 39
See application file for complete search history.

(56) References Cited

U.S. PATENT DOCUMENTS

2010/0231581 A1* 9/2010 Shroads ................ G06T 11/206
345/419
2012/0086631 A1 4/2012 Osman et al. ............ 345/156
(Continued)

OTHER PUBLICATIONS

Francone et al., "Using the User's Point of View for Interaction on Mobile Devices", Con. Proc. of IHM' 11, 23th Assn. Francophone d'Interaction Homme-Machine, Oct. 24, 2011, XP055014228, URL: http://iihm.imag.fr/publs/2011/IHM2001.
(Continued)

*Primary Examiner* — Adetokunbo O Torimiro
(74) *Attorney, Agent, or Firm* — Penilla IP, APC

(57) ABSTRACT

Methods for observing a virtual reality environment of a virtual reality player is are provided. One method includes establishing, by a handheld device of an observer, a connection with a computer executing the virtual reality environment being presented to the virtual reality player using a head mounted display (HMD). Capturing, by a first camera of the handheld device, a current position of the virtual reality player in a real world space. Capturing, by a second camera of the handheld device, a face position of the observer. The face position being monitored to determine a viewing direction to a screen of the handheld device. The screen of the handheld device is configured to present the virtual reality environment and at least part of the virtual reality player interacting in the virtual reality environment. A current position of the handheld device and the face position of the observer are continually shared with the computer executing the virtual reality environment presented to the virtual reality player. The method then enables receiving, from the computer, a video stream of the virtual reality environment that includes at least part of the virtual reality player adjusted for the current position of the virtual reality player in the real world and the viewing direction of the observer to the screen of the handheld device.

23 Claims, 11 Drawing Sheets

(51) Int. Cl.

| | | |
|---|---|---|
| *G06F 13/00* | (2006.01) | |
| *G06F 17/00* | (2019.01) | |
| *A63F 13/655* | (2014.01) | |
| *H04L 29/06* | (2006.01) | |
| *A63F 13/26* | (2014.01) | |
| *A63F 13/40* | (2014.01) | |
| *A63F 13/213* | (2014.01) | |
| *A63F 13/525* | (2014.01) | |
| *A63F 13/35* | (2014.01) | |
| *A63F 13/92* | (2014.01) | |
| *A63F 13/212* | (2014.01) | |
| *A63F 13/211* | (2014.01) | |
| *A63F 13/25* | (2014.01) | |
| *A63F 13/5255* | (2014.01) | |

(52) U.S. Cl.
CPC ............ *A63F 13/213* (2014.09); *A63F 13/25* (2014.09); *A63F 13/26* (2014.09); *A63F 13/35* (2014.09); *A63F 13/40* (2014.09); *A63F 13/525* (2014.09); *A63F 13/5255* (2014.09); *A63F 13/92* (2014.09); *H04L 67/38* (2013.01); *A63F 2300/8082* (2013.01)

(56) References Cited

U.S. PATENT DOCUMENTS

| | | | |
|---|---|---|---|
| 2012/0105473 A1* | 5/2012 | Bar-Zeev | G02B 27/017 345/633 |
| 2015/0015486 A1 | 1/2015 | Osman et al. | 345/156 |
| 2016/0267717 A1 | 9/2016 | Bar-Zeev et al. | G06T 19/006 |
| 2016/0357261 A1* | 12/2016 | Bristol | A63F 13/24 |
| 2016/0361643 A1* | 12/2016 | Allin | G06F 3/0325 |
| 2016/0361658 A1 | 12/2016 | Osman et al. | A63F 13/86 |
| 2017/0285738 A1* | 10/2017 | Khalid | G06F 3/013 |

OTHER PUBLICATIONS

PCT/US2018/029661, Int'l Search Report and Written Opinion, dated Jun. 27, 2018, EPO.

\* cited by examiner

SECOND SCREEN VIRTUAL WINDOW INTO VR ENVIRONMENT

CLAIM OF PRIORITY

This application is a non-provisional of U.S. Provisional Patent Application No. 62/492,100, filed on Apr. 28, 2017, entitled "Second Screen Virtual Window into VR Environment," which is hereby incorporated by reference.

FIELD OF THE DISCLOSURE

The present disclosure relates to virtual reality (VR) environment content presented in head mounted displays (HMDs), and methods for presenting content related to the VR environment on a second screen used by an observer in the real world space in which the VR player is interacting.

BACKGROUND

The video game industry has seen many changes over the years. As computing power has expanded, developers of video games have likewise created game software that takes advantage of these increases in computing power. To this end, video game developers have been coding games that incorporate sophisticated operations and mathematics to produce very detailed and engaging gaming experiences.

Example gaming platforms include the Sony Playstation®, Sony Playstation2® (PS2), Sony Playstation3® (PS3), and Sony Playstation4® (PS4), each of which is sold in the form of a game console. As is well known, the game console is designed to connect to a display (typically a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console may be further designed with an optical disc reader for receiving game discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head-mounted display. A head-mounted display is worn by the user and can be configured to present various graphics, such as a view of a virtual space. The graphics presented on a head-mounted display can cover a large portion or even all of a user's field of view. Hence, a head-mounted display can provide a visually immersive experience to the user.

It is in this context that embodiments of the disclosure arise.

SUMMARY

Implementations of the present disclosure include methods and systems that are used for enabling spectating virtual reality environments and content being encountered, viewed and/or interfaced with by HMD users.

In some configurations, a "window effect" for AR/VR is provided. In one configuration, the device of the user/observer tracks the head of the user viewing the screen of a portable device (i.e., second screen), and an effect is produced on the screen of the user device that resembles an effect of peering out a window. For example, if the user looks into the screen of the portable device by placing the screen closer to his face, more of the VR environment will be visible. If the user moves the device at an angle relative to his face, the user is provided an image into the VR environment exposing different content or zoom in the direction the user is viewing, e.g., adjusting a view frustum of the view.

In one configuration, use of the window effect can occur on a tracked screen where the tracked screen is used by an observer/second player to see the view of a VR player (i.e. as they appear in VR) and the observer/second player can see more detail through the window effect as they peer their real head about the screen.

In some configurations, a tracked screen is provided, but the primary player (e.g., the VR player, instead of second/observer) holds the tracked screen and VR player sees the screen in VR, and the window affect is applied as the VR player moves his head around while viewing the tracked screen. In some embodiments, a tracked screen is a tracked phone or tablet.

In one configuration, a second screen provides a type of virtual window into the VR environment, and the views into the VR environment are controllable by the observer holding the second screen relative to his eyes or face. In some configurations, the observer's eyes or face are tracked with a selfie camera in order to determine the position of the second screen of the device, while a forward facing camera of the device is looking at the VR player or the space around the VR player. This configuration provides a system to enable one or more second screens, handled by observers of the VR player. The observers can provide assistance to the VR player, as the observer may be viewing areas around the VR player that the VR player may not yet have seen. In one configuration, the observer can be an additional player, who can interact in the VR environment of the VR player.

In one embodiment, a method for observing a virtual reality environment of a virtual reality player is disclosed. The method includes establishing, by a handheld device of an observer, a connection with a computer executing the virtual reality environment being presented to the virtual reality player using a head mounted display (HMD). Capturing, by a first camera of the handheld device, a current position of the virtual reality player in a real world space. Capturing, by a second camera of the handheld device, a face position of the observer. The face position being monitored to determine a viewing direction to a screen of the handheld device. The screen of the handheld device is configured to present the virtual reality environment and at least part of the virtual reality player interacting in the virtual reality environment. A current position of the handheld device and the face position of the observer are continually shared with the computer executing the virtual reality environment presented to the virtual reality player. The method then enables receiving, from the computer, a video stream of the virtual reality environment that includes at least part of the virtual reality player adjusted for the current position of the virtual reality player in the real world and the viewing direction of the observer to the screen of the handheld device.

In some embodiments, the continually shared face position of the observer is used to identify changes in a distance between a face of the observer and the screen.

In some embodiments, a method includes receiving, based on the identified changes in the distance, a zoom-in or zoom-out image in the received video stream of the virtual reality environment. In one embodiment, the distance is measured between a front side of the handheld device of the user and the face of the user. If the user extends his hand out further, the image view into the virtual reality environment will be magnified. Conversely, if the user brings the handheld device closer to his face, the view will be zoomed out, exposing more of the space around the area where the forward facing camera of the handheld device is pointed.

In some embodiments, said zoom-in is processed when the distance between the face of the observer and the screen increases and said zoom-out is processed when distance between the face of the observer and the screen decreases.

In some embodiments, the current position of the virtual reality player in the real world space is used to identify an HMD viewing direction, the HMD viewing direction is used by the computer to approximate a view being provided to the HMD as controlled by the virtual reality player's use of the HMD.

In some embodiments, eyes of the observer are tracked to determine the viewing direction to the screen of the handheld device, the eyes being tracked for gaze using the second camera of the handheld device.

In some embodiments, movement of the handheld device by the observer around the virtual reality player causes updates to views provided by the video stream presented on the screen of the handheld device.

In some embodiments, said updates to views enable a 360 degree view around the virtual reality environment, and wherein said movement enables viewing areas of the virtual reality environment that excludes the virtual reality player.

In some embodiments, the virtual reality player is rendered in the virtual reality environment as a character that interacts with the virtual reality environment.

In some embodiments, said continually sharing is enabled via said connection, the connection being a wireless connection that is configured to send a stream of images captured using the first camera and the second camera of the handheld device to the computer.

In some embodiments, said computer is configured to analyze the stream of images to identify the current position of the virtual reality player in the real world space relative to the current position of the handheld device. The video stream provided to the screen of the handheld device enables viewing into the virtual environment presented using the HMD, and the viewing into the virtual reality environment via the handheld device is controlled by movement of the handheld device and viewing into virtual reality environment via the HMD is controlled independently by movement of the HMD by the virtual reality player.

In some embodiments, movement of the handheld device by the observer enables viewing above, below and around virtual reality player as depicted in the virtual reality environment.

In some embodiments, movement of the handheld device is relative to the current position of the virtual reality player in the real world space, the movement of the handheld device enables viewing objects in the virtual reality environment in a pan-out view when the handheld device is moved closer a face of the observer and a pan-in view when the handheld device is moved away from the face of the observer.

In one embodiment, a method for observing a virtual reality environment of a virtual reality player is disclosed. The method includes executing the virtual reality environment via a computer and establishing a connection between the computer and a handheld device of an observer. The virtual reality environment is presented to the virtual reality player using a head mounted display (HMD), then, receiving image data for identifying a first position of the virtual reality player in a real world space. The image data is captured by a first camera of the handheld device. The method includes receiving image data for identifying a face position of the observer to determine a viewing direction to a screen of the handheld device using a second camera. The screen of the handheld device is configured to present the virtual reality environment and at least part of the virtual reality player interacting in the virtual reality environment. A current position of the handheld device and the face position of the observer are continually received by the computer executing the virtual reality environment presented to the virtual reality player. The method includes sending to the handheld device a video stream of the virtual reality environment that includes at least part of the virtual reality player adjusted for the current position of the virtual reality player in the real world and the viewing direction of the observer to the screen of the handheld device.

In some embodiments, the continually received face position of the observer is used to identify changes in a distance between a face of the observer and the screen. Then, sending, based on the identified changes in the distance, zoom-in or zoom-out images for the sent video stream of the virtual reality environment.

In some embodiments, said zoom-in is processed when the distance between the face of the observer and the screen increases and said zoom-out is processed when distance between the face of the observer and the screen decreases.

In some embodiments, the current position of the virtual reality player in the real world space is used to identify an HMD viewing direction, the HMD viewing direction is used by the computer to approximate a view being provided to the HMD as controlled by the virtual reality player's use of the HMD.

In some embodiments, eyes of the observer are tracked to determine the viewing direction to the screen of the handheld device, the eyes being tracked for gaze using the second camera of the handheld device.

In some embodiments, the computer is configured to analyze a stream of images to identify the current position of the virtual reality player in the real world space relative to the current position of the handheld device, such that the video stream provided to the screen of the handheld device enables viewing into the virtual environment presented using the HMD, such that the viewing into the virtual reality environment via the handheld device is controlled by movement of the handheld device and viewing into virtual reality environment via the HMD is controlled independently by movement of the HMD by the virtual reality player.

In some embodiments, the virtual reality player is rendered in the virtual reality environment as a character that interacts with the virtual reality environment, and said continually received is enabled via said connection, the connection being a wireless connection that is configured to receive a stream of images captured using the first camera and the second camera of the handheld device to the computer.

In some embodiments, movement of the handheld device by the observer enables viewing above, below and around virtual reality player as depicted in the virtual reality environment.

In some embodiments, movement of the handheld device by the observer around the virtual reality player causes updates to views of the video stream presented on the screen of the handheld device, and said updates to views enable a 360 degree view around the virtual reality environment, and wherein said movement enables viewing areas of the virtual reality environment that excludes the virtual reality player.

In some embodiments, the movement of the handheld device is relative to the current position of the virtual reality player in the real world space, the movement of the handheld device enables viewing objects in the virtual reality environment in a pan-out view when the handheld device is moved closer to the face of the observer and a pan-in view when the handheld device is moved away from the face of the observer.

In some embodiments, the handheld device can be a stereoscopic handheld device (e.g., either through 3D glasses or autostereoscopic), or a light field display to provide a different image to each of the left eye and right eye. In one configuration, position and orientation may be measured with respect to each eye. In one embodiment, the converse can be true, e.g., where the VR player is looking into the real world, by rendering a different image to each eye in the virtual window.

In still other embodiments, systems can be configured to allow a VR player to view into a second VR world of another VR player.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which.

DETAILED DESCRIPTION

The following implementations of the present disclosure provide methods, systems, computer readable media and cloud systems, for enabling a user device to view a VR player interacting, and the user's device is provided with an image of the VR player in the VR space (e.g., as a character or avatar in the VR space). In one configuration, a camera of the user's device uses the selfie camera to track the user's face and/or eyes for position, relative to the screen. The position of the device can further be tracked using inertial data obtained from an inertial sensor in the device. This tracking information can be communicated to a computer. In this configuration, the forward facing camera of the device views a space in front, e.g., where the VR player is interacting.

The VR player is also being tracked separately. Tracking of the VR player can be conducted using various technologies. Examples include LED tracking of the HMD using one or more cameras, photo sensors on the HMD which detect emitted IR light, inertial sensors, and combinations thereof. The tracked position of the VR player is communicated to the computer. The computer is configured to produce a streaming view of the VR player in the VR environment, from the perspective of the device of the observer. Depending on the positional view of the device relative the VR player, the second screen of the device is provided a different view. The view, in addition to providing different perspectives and positions, will also provide a windowing effect, which allows dynamic changes of views into the VR environment, depending on the position, angle and peering direction into the screen. The viewing direction into the screen, as noted, is tracked by the back facing camera, i.e., selfie camera.

In some embodiments, using an autostereoscopic 3D display enables to display the virtual world in stereo. Since we are tracking the head, this 3D image does not need to be visible from all angles, just the one for the spectator/observer.

In a case where the person is in VR looking out into the real world, it is possible to use a very wide field of view camera into the real world so that we render the appropriate viewport based on the virtual user's view. In an alternative, rather than use a wide angle camera, a camera on a gimbal can be implemented that can be pointed to match the viewpoint of the virtual user.

It will be obvious, however, to one skilled in the art, that the present disclosure may be practiced without some or all of these specific details. In other instances, well known process operations have not been described in detail in order not to unnecessarily obscure the present disclosure.

Figure 1:
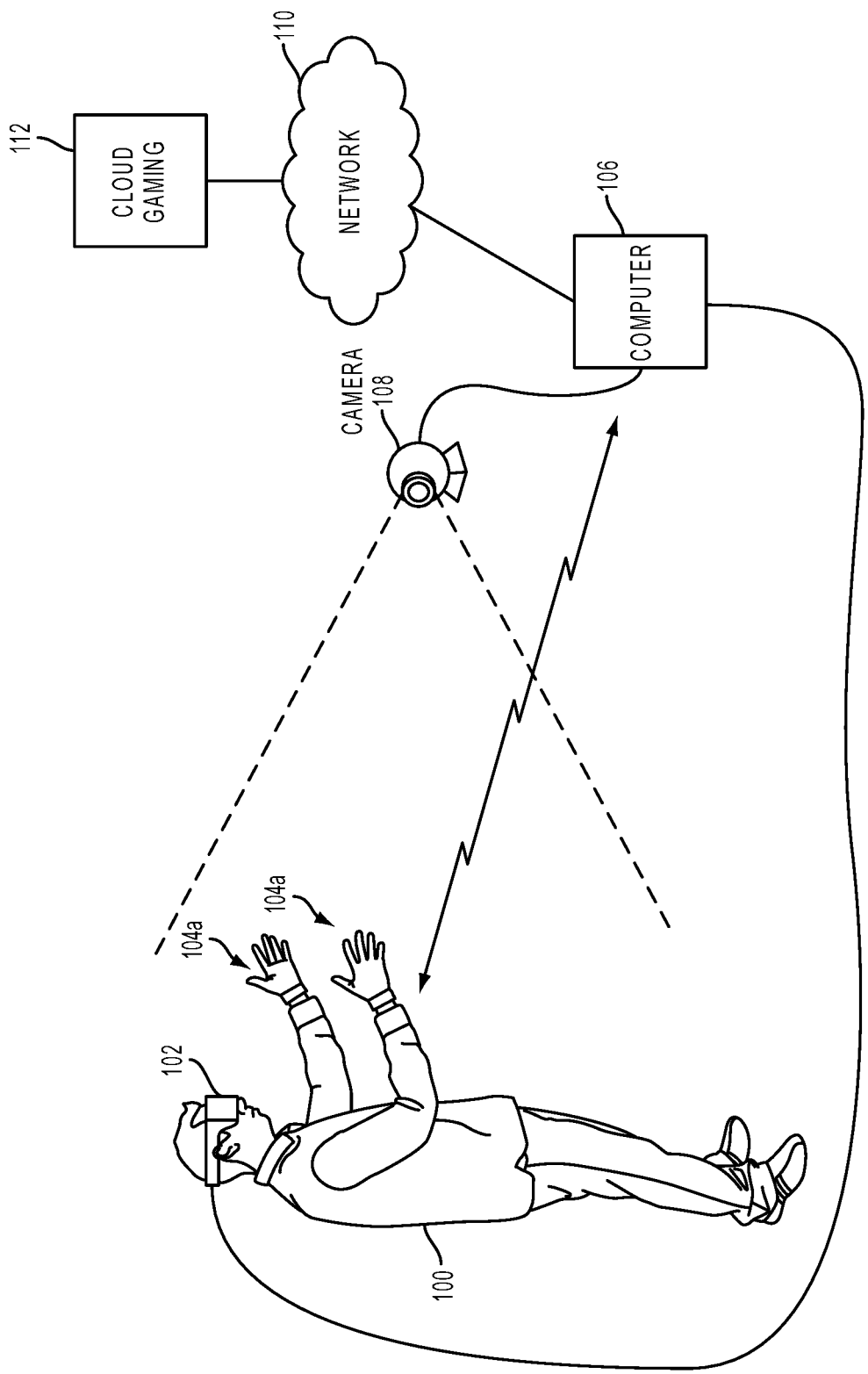
FIG. 1 illustrates a system for interactive gameplay of a video game, in accordance with an embodiment of the disclosure.

FIG. 1 illustrates a system for interactive gameplay of a video game, in accordance with an embodiment of the disclosure. A user 100 is shown wearing a head-mounted display (HMD) 102. The HMD 102 is worn in a manner similar to glasses, goggles, or a helmet, and is configured to display a video game or other content to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user.

In one embodiment, the HMD 102 can be connected to a computer 106. The connection to computer 106 can be wired or wireless. The computer 106 can be any general or special purpose computer known in the art, including but not limited to, a gaming console, personal computer, laptop, tablet computer, mobile device, cellular phone, tablet, thin client, set-top box, media streaming device, etc. In one embodiment, the computer 106 can be configured to execute a video game, and output the video and audio from the video game for rendering by the HMD 102. It should be understood that rendering of the virtual reality space or views can also be by way of the handheld device. In some embodiments, the virtual reality space can be generated by the computer 106, and views into the virtual reality space can also be generated by the handheld device. In some embodiments, the rendering can be by way of the computer, and a video stream can be transferred to the handheld device. In still other embodiments, part of the render can be by way of a cloud or server computer, or a combination of the computer 106, the handheld device and the cloud/server computer. In still another embodiment, two computers may be provided (one for generating the view streamed to the handheld and one for generating the view provided to the HMD). It should be understood that in some embodiments, instead of a handheld device, the second device may be a computer providing views into the VR environment via a screen.

The user 100 may operate a glove interface object 104a to provide input for the video game. Additionally, a camera 108 can be configured to capture images of the interactive environment in which the user 100 is located. These captured images can be analyzed to determine the location and movements of the user 100, the HMD 102, and the glove interface object 104a. In one embodiment, the glove interface object 104a includes a light which can be tracked to determine its location and orientation.

As described below, the way the user interfaces with the virtual reality scene displayed in the HMD 102 can vary, and other interface devices in addition to glove interface objects 104a, can be used. For instance, single-handed controllers can also be used, as well as two-handed controllers. In some embodiments, the controllers can be tracked themselves by tracking lights associated with the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment presented on the HMD 102.

Additionally, the HMD 102 may include one or more lights which can be tracked to determine the location and orientation of the HMD 102. The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In another embodiment, the computer 106 functions as a thin client in communication over a network with a cloud gaming provider 112. The cloud gaming provider 112 maintains and executes the video game being played by the user 102. The computer 106 transmits inputs from the HMD 102, the glove interface object 104a and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a vibration feedback command is provided to the glove interface object 104a.

In one embodiment, the HMD 102, glove interface object 104a, and camera 108, may themselves be networked devices that connect to the network 110 to communicate with the cloud gaming provider 112. For example, the computer 106 may be a local network device, such as a router, that does not otherwise perform video game processing, but which facilitates passage of network traffic. The connections to the network by the HMD 102, glove interface object 104a, and camera 108 may be wired or wireless.

Additionally, though embodiments in the present disclosure may be described with reference to a head-mounted display, it will be appreciated that in other embodiments, non-head mounted displays may be substituted, including without limitation, a television, projector, LCD display screen, portable device screen (e.g. tablet, smartphone, laptop, etc.) or any other type of display that can be configured to render video and/or provide for display of an interactive scene or virtual environment in accordance with the present embodiments.

Figure 2A:
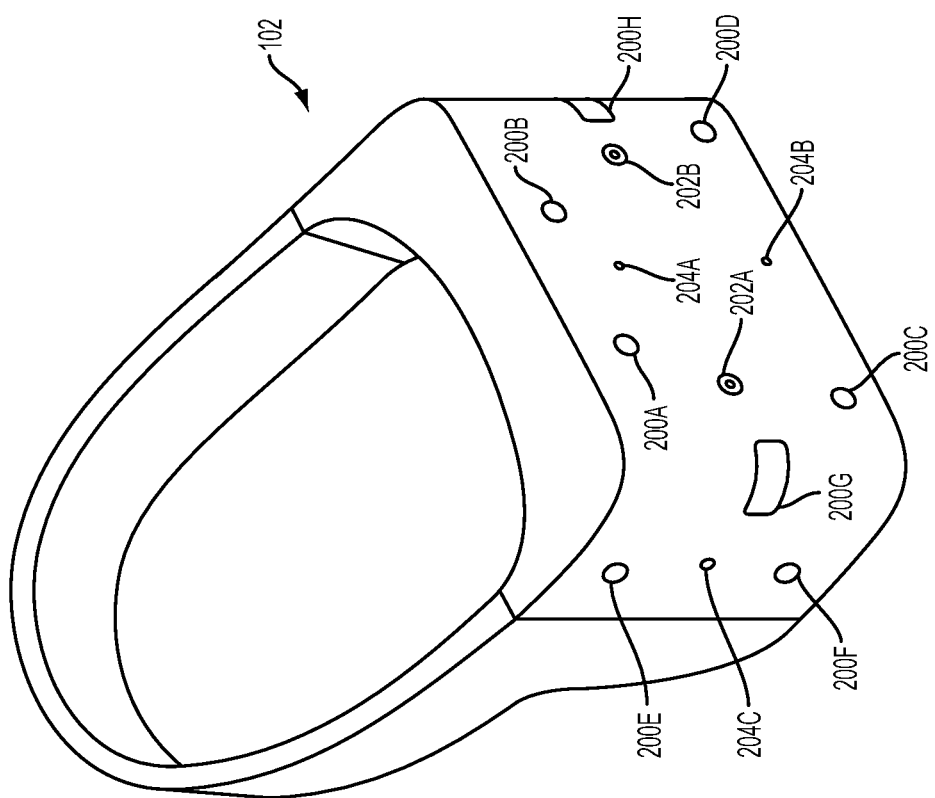
FIG. 2A illustrates a head-mounted display (HMD), in accordance with an embodiment of the disclosure.

FIG. 2A illustrates a head-mounted display (HMD), in accordance with an embodiment of the disclosure. As shown, the HMD 102 includes a plurality of lights 200A-H. Each of these lights may be configured to have specific shapes, and can be configured to have the same or different colors. The lights 200A, 200B, 200C, and 200D are arranged on the front surface of the HMD 102. The lights 200E and 200F are arranged on a side surface of the HMD 102. And the lights 200G and 200H are arranged at corners of the HMD 102, so as to span the front surface and a side surface of the HMD 102. It will be appreciated that the lights can be identified in captured images of an interactive environment in which a user uses the HMD 102. Based on identification and tracking of the lights, the location and orientation of the HMD 102 in the interactive environment can be determined. It will further be appreciated that some of the lights may or may not be visible depending upon the particular orientation of the HMD 102 relative to an image capture device. Also, different portions of lights (e.g. lights 200G and 200H) may be exposed for image capture depending upon the orientation of the HMD 102 relative to the image capture device.

In one embodiment, the lights can be configured to indicate a current status of the HMD to others in the vicinity. For example, some or all of the lights may be configured to have a certain color arrangement, intensity arrangement, be configured to blink, have a certain on/off configuration, or other arrangement indicating a current status of the HMD 102. By way of example, the lights can be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights might also be configured to indicate relative intensity levels of gameplay. For example, the intensity of lights, or a rate of blinking, may increase when the intensity of gameplay increases. In this manner, a person external to the user may view the lights on the HMD 102 and understand that the user is actively engaged in intense gameplay, and may not wish to be disturbed at that moment.

The HMD 102 may additionally include one or more microphones. In the illustrated embodiment, the HMD 102 includes microphones 204A and 204B defined on the front surface of the HMD 102, and microphone 204C defined on a side surface of the HMD 102. By utilizing an array of microphones, sound from each of the microphones can be processed to determine the location of the sound's source. This information can be utilized in various ways, including exclusion of unwanted sound sources, association of a sound source with a visual identification, etc.

Figure 3:
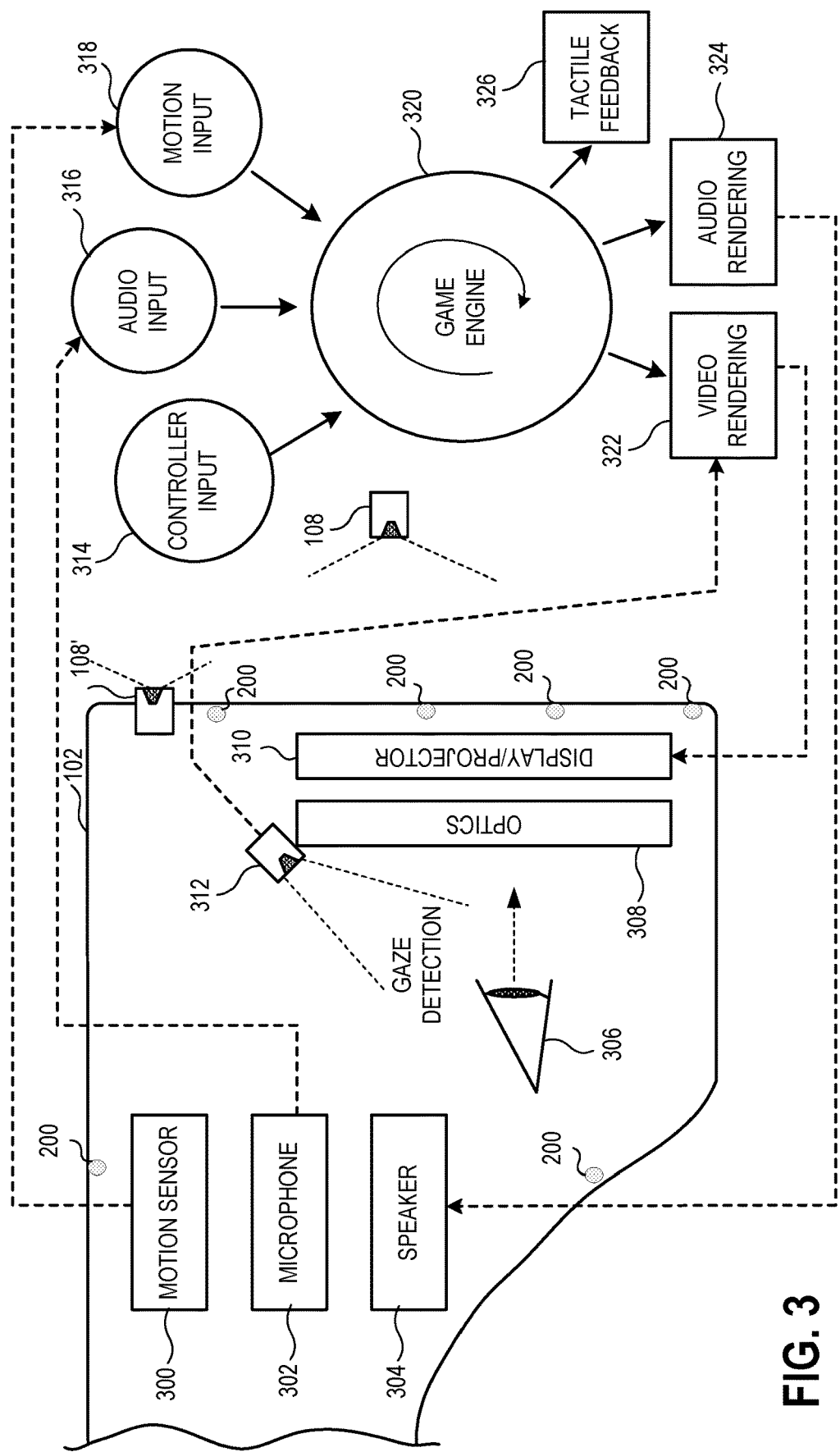
FIG. 3 conceptually illustrates the function of an HMD in conjunction with an executing video game, in accordance with an embodiment of the disclosure.

The HMD 102 may also include one or more image capture devices. In the illustrated embodiment, the HMD 102 is shown to include image capture devices 202A and 202B. By utilizing a stereoscopic pair of image capture devices, three-dimensional (3D) images and video of the environment can be captured from the perspective of the HMD 102. Such video can be presented to the user to provide the user with a "video see-through" ability while wearing the HMD 102. That is, though the user cannot see through the HMD 102 in a strict sense, the video captured by the image capture devices 202A and 202B (e.g., or one or more front facing cameras 108' disposed on the outside body of the HMD 102, as shown in FIG. 3 below) can nonetheless provide a functional equivalent of being able to see the environment external to the HMD 102 as if looking through the HMD 102. Such video can be augmented with virtual elements to provide an augmented reality experience, or may be combined or blended with virtual elements in other ways. Though in the illustrated embodiment, two cameras are shown on the front surface of the HMD 102, it will be appreciated that there may be any number of externally facing cameras installed on the HMD 102, oriented in any direction. For example, in another embodiment, there may be cameras mounted on the sides of the HMD 102 to provide additional panoramic image capture of the environment.

Figure 2B:
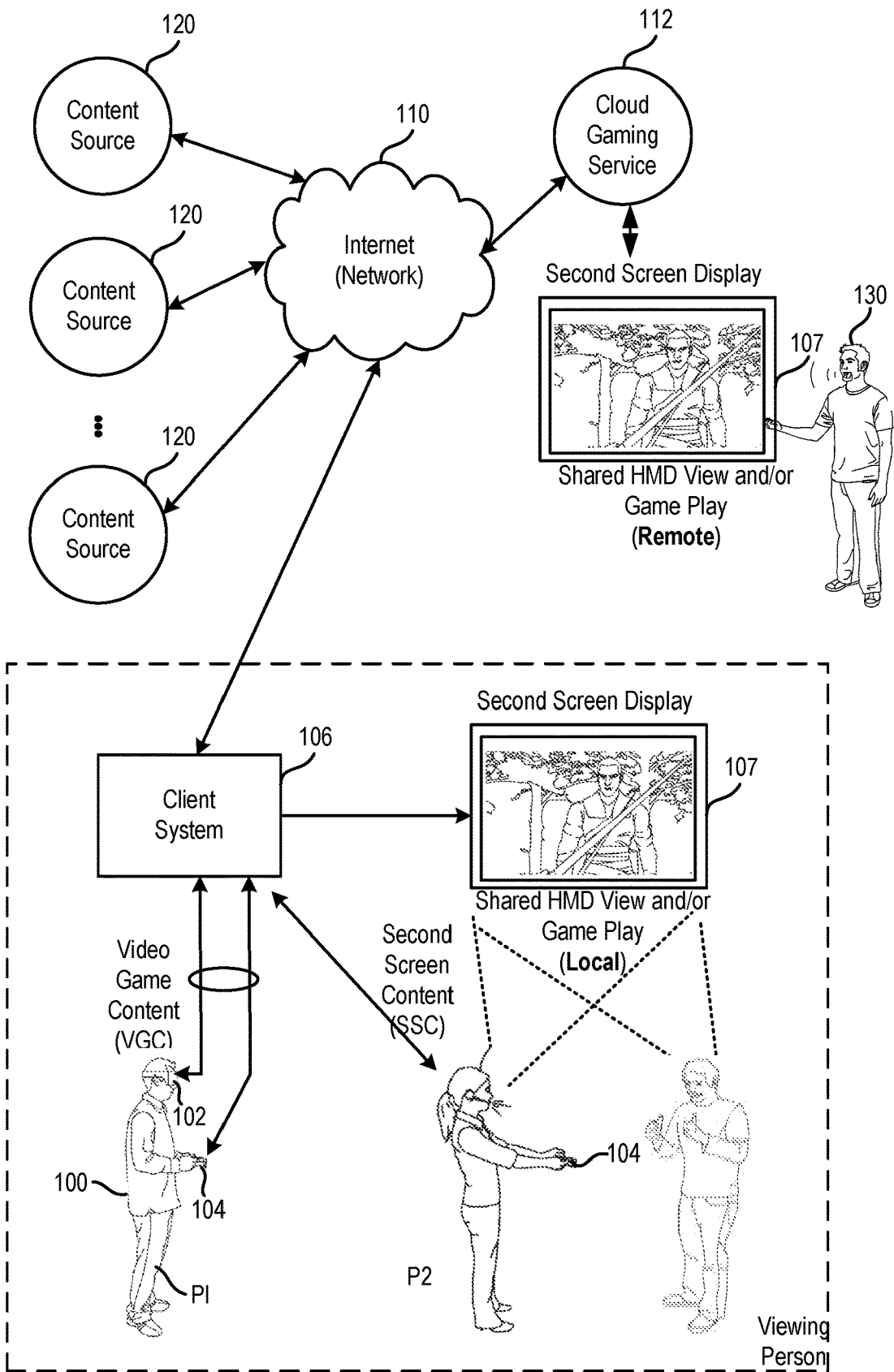
FIG. 2B illustrates one example of an HMD user interfacing with a client system, and the client system providing content to a second screen display, which is referred to as a second screen, in accordance with one embodiment.

FIG. 2B illustrates one example of an HMD 102 user interfacing with a client system 106, and the client system 106 providing content to a second screen display, which is referred to as a second screen 107. As will be described below, the client system 106 may include integrated electronics for processing the sharing of content from the HMD 102 to the second screen 107. Other embodiments may include a separate device, module, connector, that will interface between the client system and each of the HMD 102 and the second screen 107. In this general example, user 100 is wearing HMD 102 and is playing a video game using controller 104. The interactive play by user 100 will produce video game content (VGC), which is displayed interactively to the HMD 102.

In one embodiment, the content being displayed in the HMD 102 is shared to the second screen 107. In one example, a person viewing the second screen 107 can view the content being played interactively in the HMD 102 by user 100. In another embodiment, another user (e.g. player 2) can interact with the client system 106 to produce second screen content (SSC). The second screen content produced by a player also interacting with the controller 104 (or any type of user interface, gesture, voice, or input), may be produced as SSC to the client system 106, which can be displayed on second screen 107 along with the VGC received from the HMD 102.

Accordingly, the interactivity by other users who may be co-located or remote from an HMD user can be social, interactive, and more immersive to both the HMD user and users that may be viewing the content played by the HMD user on a second screen 107. As illustrated, the client system 106 can be connected to the Internet 110. The Internet can also provide access to the client system 106 to content from various content sources 120. The content sources 120 can include any type of content that is accessible over the Internet.

Such content, without limitation, can include video content, movie content, streaming content, social media content, news content, friend content, advertisement content, etc. In one embodiment, the client system 106 can be used to simultaneously process content for an HMD user, such that the HMD is provided with multimedia content associated with the interactivity during gameplay. The client system 106 can then also provide other content, which may be unrelated to the video game content to the second screen. The client system 106 can, in one embodiment receive the second screen content from one of the content sources 120, or from a local user, or a remote user.

FIG. 3 conceptually illustrates the function of the HMD 102 in conjunction with an executing video game, in accordance with an embodiment of the disclosure. The executing video game is defined by a game engine 320 which receives inputs to update a game state of the video game. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated embodiment, the game engine receives, by way of example, controller input 314, audio input 316 and motion input 318. The controller input 314 may be defined from the operation of a gaming controller separate from the HMD 102, such as a handheld gaming controller (e.g. Sony DUALSHOCK®4 wireless controller, Sony PlayStation® Move motion controller) or glove interface object 104a. By way of example, controller input 314 may include directional inputs, button presses, trigger activation, movements, gestures, or other kinds of inputs processed from the operation of a gaming controller. The audio input 316 can be processed from a microphone 302 of the HMD 102, or from a microphone included in the image capture device 108 or elsewhere in the local environment. The motion input 318 can be processed from a motion sensor 300 included in the HMD 102, or from image capture device 108 as it captures images of the HMD 102. The game engine 320 receives inputs which are processed according to the configuration of the game engine to update the game state of the video game. The game engine 320 outputs game state data to various rendering modules which process the game state data to define content which will be presented to the user.

In the illustrated embodiment, a video rendering module 322 is defined to render a video stream for presentation on the HMD 102. The video stream may be presented by a display/projector mechanism 310, and viewed through optics 308 by the eye 306 of the user. An audio rendering module 304 is configured to render an audio stream for listening by the user. In one embodiment, the audio stream is output through a speaker 304 associated with the HMD 102. It should be appreciated that speaker 304 may take the form of an open air speaker, headphones, or any other kind of speaker capable of presenting audio.

In one embodiment, a gaze tracking camera 312 is included in the HMD 102 to enable tracking of the gaze of the user. The gaze tracking camera captures images of the user's eyes, which are analyzed to determine the gaze direction of the user. In one embodiment, information about the gaze direction of the user can be utilized to affect the video rendering. For example, if a user's eyes are determined to be looking in a specific direction, then the video rendering for that direction can be prioritized or emphasized, such as by providing greater detail or faster updates in the region where the user is looking. It should be appreciated that the gaze direction of the user can be defined relative to the head mounted display, relative to a real environment in which the user is situated, and/or relative to a virtual environment that is being rendered on the head mounted display.

Broadly speaking, analysis of images captured by the gaze tracking camera 312, when considered alone, provides for a gaze direction of the user relative to the HMD 102. However, when considered in combination with the tracked location and orientation of the HMD 102, a real-world gaze direction of the user can be determined, as the location and orientation of the HMD 102 is synonymous with the location and orientation of the user's head. That is, the real-world gaze direction of the user can be determined from tracking the positional movements of the user's eyes and tracking the location and orientation of the HMD 102. When a view of a virtual environment is rendered on the HMD 102, the real-world gaze direction of the user can be applied to determine a virtual world gaze direction of the user in the virtual environment.

Additionally, a tactile feedback module 326 is configured to provide signals to tactile feedback hardware included in either the HMD 102 or another device operated by the user, such as a controller 104. The tactile feedback may take the form of various kinds of tactile sensations, such as vibration feedback, temperature feedback, pressure feedback, etc.

At present, streaming services for sharing game replays are very popular. The DualShock®4 wireless controller includes a "share button" directly on the controller to enable such sharing. Implementations of the present disclosure improve sharing replays for people who wish to explore the replays using an HMD/VR headset. Implementations of the present disclosure provide for rendering of a game replay with a very wide field of view to allow the spectator to move his head freely using an HMD and view the replay from novel vantage points. The traditional streaming approach would limit the replay to only what the original player viewed, so that the view direction would be independent of the spectator's head position and orientation, and if the spectator using an HMD moved his head, nothing would change.

Implementations of the disclosure provide for the rendering of videos in a wide enough field of view to support novel viewpoints in an HMD. A custom build of a game engine that runs on a cloud server (e.g. on console gaming hardware, e.g. PlayStation®4 hardware, in the cloud), that accepts as input game state streamed from the original player's game engine and uses it to render an extremely wide field of view (e.g. 150 degree plus) view of the game, that can then be used for real-time streaming and/or pre-recorded playback of that game session. It will be appreciated that the extremely wide field of view is in excess of the HMD's field of view, allowing for the spectator wearing the HMD to look around in the replay. The actual game is configured to stream its state to the networked version of the engine.

As described above, there is a need to provide users the ability to spectate, e.g., watch the interactive activity being experienced by users wearing HMDs 102. For example, one HMD virtual reality player may be immersed in the activity presented in the HMD, while other persons may be co-located with the player. These other co-located players may find enjoyment in watching the interactivity experienced or virtual reality scene being viewed by the HMD player. As used herein, an HMD player is one that is viewing content presented on the HMD, or can be one that is interacting with some content resented on the HMD, or can be playing a game presented on the HMD. As such, reference to the player, is only made with reference to the user that is wearing the HMD, irrespective of the type of content being presented on the HMD.

In still other embodiments, other persons that are not co-located with the HMD player may wish to view the content, interactivity, or media being presented in the HMD of the HMD player. For instance, a website may be provided to present users with the ability to select from different HMD players, so as to watch and spectate while the HMD player performs his or her activities. This example is similar to standard Twitch-type experiences, which allow users connected to the Internet to access the website and search for different types of content or media being played by remote players. The remote players may, in some embodiments, be playing games using an HMD 102.

In other embodiments, the remote players may be playing games or watching content using a display screen of a device or a television display screen. Broadly speaking, users wishing to watch the activity of another player that is remote, e.g., over a website, can then select specific players or types of games, or thumbnails of the games, or thumbnails of the content, to view the activity being directed by the HMD player. Thus, a website can be provided that enables users to view and select specific interactive content that may be actively played by a remote HMD player. The remote viewer wishing to view the activity by the HMD player, can simply click on that content and begin watching.

The person watching and viewing the actions by the HMD player is generally referred to as a spectator. Spectators are those persons who are given access to view the activities, interactivities, actions, movements, etc., but are not necessarily controlling the game action. For this reason, these viewers are referred to as spectators. In the context of an HMD player, the content being presented in the HMD display is dynamic and is controlled by the movements of the HMD player. For example, when the HMD player moves his or her head around, that player is presented with different content that is viewable, similar to the way real world viewing of a person's surroundings can occur.

Although the head movements of the HMD player are natural to the HMD player, a spectator that is provided the same view as the HMD player may become nauseous or dizzy when viewing the content due to the rapid movements. The reason for this is that the viewer is not him or herself moving their head in a similar way as does the HMD player, which causes the content to be changed based on the direction of viewing by the HMD player. In the various embodiments described herein, methods, systems, computer readable media, and cloud configurations are provided, which enable spectators to view content being viewed by the HMD player, in a way that does not distract the spectator nor does it have the tendency of causing the spectator to become dizzy or nauseous.

By way of example, some of the embodiments described herein teach ways of providing different viewing spots within the virtual reality environment being viewed by the HMD player. In some embodiments, the viewing spots are fixed in terms of the angle, direction, and content being viewable by the spectator. Thus, if the HMD player moves his or her head one way or the other, the spectator's view into the virtual reality environment may be maintained stable. In some embodiments, as the HMD player moves and traverses through different virtual reality environments scenes, locations, areas, levels, chapters, etc., the spectating user can be provided with different viewing spots, which are customized to the viewing spectator. For instance, various viewing spots can be pre-authored for different types of content.

If the content is a video game, viewing spots along different paths that can be taken in the videogame can be predefined as pre-authored spots for viewing by the spectator. Thus, when the HMD player moves along a particular path, the spectator can be provided with viewing spots along that path, which may be preselected or pre-authored by the game developer, earlier spectators, or the HMD player. In this manner, a spectator may be popped from one viewing spot to the next viewing spot, based on a determination that those viewing spots are superior or better or provide more interesting views as the HMD player moves about an HMD VR environment. In further embodiments, spectators may be provided with sub-portions of viewable content that is being viewed by the HMD player. In other embodiments, spectators may be provided with additional content that is not yet viewable by the HMD player.

Depending on the game, the environment, the type of content, the type of multimedia, or by defined rules or constraints, spectators may be provided with less or more of the viewable content being viewed by the HMD player. As mentioned above, the content that is made viewable to a spectator can be the same content being viewed by the HMD player, but from a reference point of view that is different than the HMD player. However, in some embodiments the view provided to the spectator can be similar to the HMD player's view, but at a slight different angle, or viewing perspective. Further, the spectator can be provided a similar view to that provided to the HMD player, from the context of a virtual camera writing over the head of the HMD virtual player. In one embodiment, instead of moving the virtual camera view provided for the spectator of the content being viewed by the HMD player, the spectator's view is not moved at the same rate or speed as the view is moved by the HMD player when the HMD player makes head movements.

In this embodiment, the virtual camera view provided to the spectator can be moved at a slower rate than does the view of the HMD player, which changes based on the actual speed of the user's head movements. Still further, the movement of the virtual camera view can be set to follow the movement of the HMD player's head, with a delay. The delay can be similar to a conceptual rubber band that links the virtual camera view to the movements of the HMD. That is, if the user's head moves to the left quickly, the spectator's virtual camera view will move to the left slower, with the delay similar to the way an object would trail when connected by a rubber band to a moving object ahead of it. In some configurations, a gearing ratio would be applied to the movement of the virtual camera view, such that the virtual camera moves at a rate that trails the movement of the actual view of the HMD player. The gearing ratio may be modified dynamically by the computer, the game, and/or program executing the views for the spectator into the virtual reality scenes. The gearing may be modified, for instance, faster in some games, some scenes, some situations, some levels, for some users, etc., or slower in other instances. By using dynamic gearing, the movement of the virtual camera view can be smoothed out, so as to provide a more pleasant viewing experience for the spectator view, even when the HMD moves fast or erratic.

In further embodiments described below, spectators can be provided with visual clues to enable the spectator to identify where the HMD player is looking within a virtual reality environment. One configuration can allow for tracking of the gaze of the HMD player, to determine what exactly the HMD player is looking at within the VR scene. For the spectator, who may be viewing the VR scene from the perspective of the virtual camera view (e.g. virtual camera floating behind the head of the HMD player), it would be useful to determine what is the focus in the particular scene. In this manner, the spectator can also focus upon what the virtual reality player feels is important in the scene.

In some examples, and a first-person shooter game, the spectator may want to know where the HMD player is looking, such as to identify enemies or obstacles. In one embodiment, by tracking the gaze of the HMD player, it is possible to identify what the HMD player is looking at, by highlighting content, changing the contrast of certain objects or locations, encircle content, add a marker, grey-out in area, add flashing beacons, add text, add floating objects, etc. In this manner, the spectator can then know for sure where the HMD player is looking, so the spectator himself can also view that same area and experience the content with more enjoyment.

For instance, the HMD player may be more experienced in a particular game, or has watched a particular type of content, and providing this indicator of where the HMD player is looking in the virtual reality scene will provide guidance, visual cues, and help to the spectator. In some embodiments, these identifying features can be turned on and off, so as to remove distraction. The identifiers can be activated by the HMD player or can be activated by the spectator. In some embodiments, where multiple spectators are viewing the same content provided by the HMD player, e.g. in a Twitch presentation, each of the spectators can be provided with different controls that provide to them the ability to provide the visual indicators or not. From the perspective of the HMD player, the indicators may not be shown at all in the HMD of the HMD player. However, these indicators will be useful to the spectator or spectators that may be viewing the content being interacted with by the HMD player.

In some embodiments, spectators can be provided with controls that allow the spectator to identify specific listening zones within the virtual reality environment. The listening zones allow spectators to select where in the virtual reality environment they wish to listen from. What this means is that the spectator is essentially provided with listening audio and acoustics that mimic a situation where the spectator would actually be present in the scene from that specific location. By way of example, if a spectator is viewing HMD content that includes a building across the street, relative to the viewing location, the spectator can identify some location in the building, e.g. the second-story where a person is standing, and select to listen at that location.

This functionality provides a listening teleportation for the spectator, which allows the spectator to listen to the content of audio, and acoustics as if the spectator were sitting or standing in the second-story building. The audio and acoustics, in one example, would essentially magnify the audio sounds that would be present at the second-story location of the building, and reduce the sounds that are further away from that virtual location. In some embodiments, the spectator can from time to time, select different locations within the environment for being the primary listening zone. In still other embodiments, the listening zone can also be adjusted to be the same listening zone of the HMD player. A spectator can be provided with switchable selection capabilities, so as to identify where in the virtual environment the spectator wishes to listen.

Again, it is noted that the spectator can be local to the HMD player, and can be viewing the HMD content on a second screen as described with reference to FIG. 2B. Alternatively, the local viewer, being a spectator, can also be wearing an HMD, which provides spectator viewing into the HMD player content. In still another embodiment, the spectator can be remote, and can be viewing from a webpage if the HMD player content is being published to a website that allows for viewing. In some embodiments, the remote viewers, which act as spectators, can be watching live or substantially live content by the HMD player. In other embodiments, the remote viewers, which act as spectators, can be watching a recorded version of the content that was viewed by the HMD player. Still further, websites can be provided that allow for multiple or even many multiples of spectators to watch the same content of the HMD player, whether live or recorded.

Figure 4:
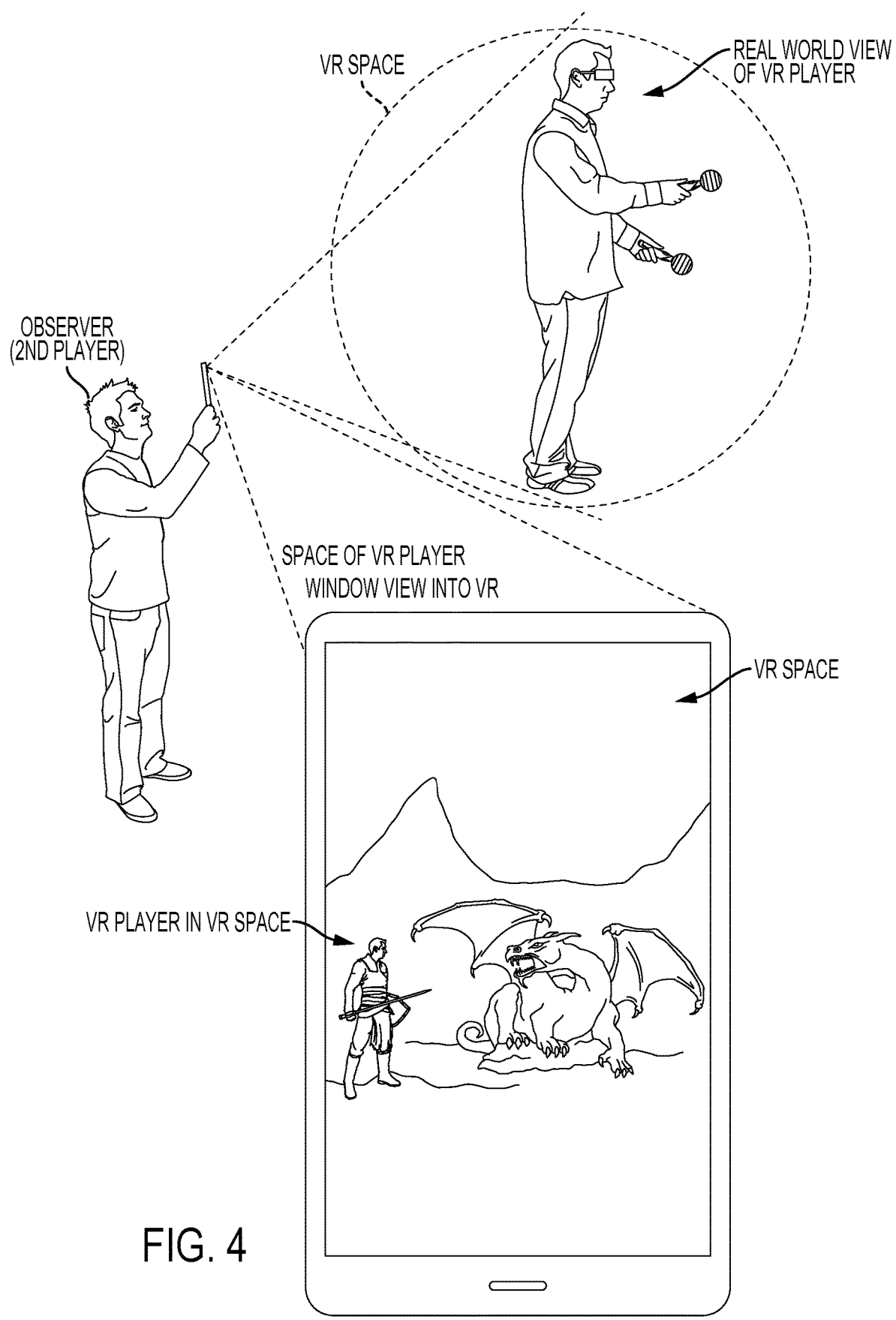
FIG. 4 illustrates an example of an observer user utilizing a device to view the real world of a VR player, that's interacting in a VR space, and providing a window view into the VR space, in accordance with one embodiment.

FIG. 4 illustrates an example of an observer using a device, e.g. portable device or smart phone, to view the real world space of a VR player, in accordance with one embodiment. In this example, the position of the device of the observer is tracked relative to the face of the observer. The tracking can be processed by a camera facing the face of the observer, so as to detect the position of the face relative to the device. As the user moves the device around, the inertial sensor of the device can also track the positional changes of the device in addition to the relative position of the device to the face of the user. In this manner, changes in angle, movement, rotation, and general motions can be tracked. By tracking the position of the device relative to the face or eyes of the observer, different vantage points and views into the virtual-reality space of the VR player can be provided to the observer.

In one embodiment, a camera of the device of the observer, i.e., handheld device camera facing away from the observer, can capture image data used to identify a current position of the virtual reality player in a real world space. For example, the image data captured can identify objects in the real world space, e.g., such as walls, furniture, other people, objects, etc., and use those objects as anchors. These anchors can be used as one or more reference points in the 3D space of the real world, where the VR player is playing. In some embodiments, different objects can have corners or shapes, which can be tracked with a depth sensor of the handheld device, which further assists in determining the location of the VR player, or changes in location of the VR player as the VR player moves around while interacting with the virtual reality environment. In still other embodiments, the handheld device of the observer can communicate and exchange signal data, e.g., signal strength information with the HMD of the VR player or controller.

This information can be used, in addition to the image data to determine where the VR player is looking and changes in view direction as the VR player moves around during interactivity. In still other embodiments, the HMD or computer that executes the virtual reality environment can track position of the VR player in the real world space, e.g., using external cameras on the HMD or cameras in the real world space looking at the VR player. One or more cameras on the HMD can also track around the VR player, e.g., 360 degrees around the VR player to locate the observer. This information can then be used to provide a view into the virtual reality environment that the VR player is looking into or is exploring. In some embodiments, the observer looking at the screen of the handheld device can view none or part of the VR player, as depicted in the VR environment, and the surrounding areas, objects and animations in the virtual reality environment. As such, by tracking the position of the handheld device, relative to the VR player, and relative to the viewing direction of the observer into the screen of the handheld device, the observer can be provided window into the virtual reality environment of the VR player.

In one embodiment, the VR content being rendered to the VR player can be augmented and changed to produce a separate stream delivered to the observer's phone, which is consistent with the vantage point in view into the VR space. In addition, by tracking the position of the phone relative to the user's face, a window view into the VR space can be controlled. The window view into the VR space will depend on the position of the user's face and eyes relative to the screen. If the user gets closer to the screen, the user will be able to see more content around the virtual reality character portrayed by the VR player. If the user moves the phone away from the user's face, then the view into the VR space will be narrower.

In some embodiments, the camera facing the user's face captures images of the user's face. The images can be used for processing gaze detection. In further embodiments, the images can be used to determine proximity of the user's face to the camera or screen of the handheld device. In some embodiments, inertial sensors of the handheld device are used to determine tilt and position changes of the handheld device. In some embodiments, a depth sensing camera or depth sensor can be used by the handheld device to determine position and/or orientation of the handheld device relative to the face of the observer. In some embodiments, a sensor fusion effect can be processed, using multiple sensors (e.g., image, depth, sound, IR light, etc.) to determine the position and orientation of the handheld device relative to the observer's face and direction of pointing or view toward the virtual reality environment of the VR player.

The user can also move the phone side to side, or at different angles and peer into the edges of the screen to view more content or less content; similar to looking out of a window and being able to see more the closer you approach the window. If the user moves away from the screen, less content may be viewable or different content may be viewable relative to the VR space of the VR player. As further shown, the window will therefore be controlled by the track position of the observer's eyes or face looking into the VR space. The relative positions of the device to the user's face can also control a pan-in or pan-out function, or zoom in or zoom out function, or positionally look around the corner by walking around the VR player.

Figure 5:
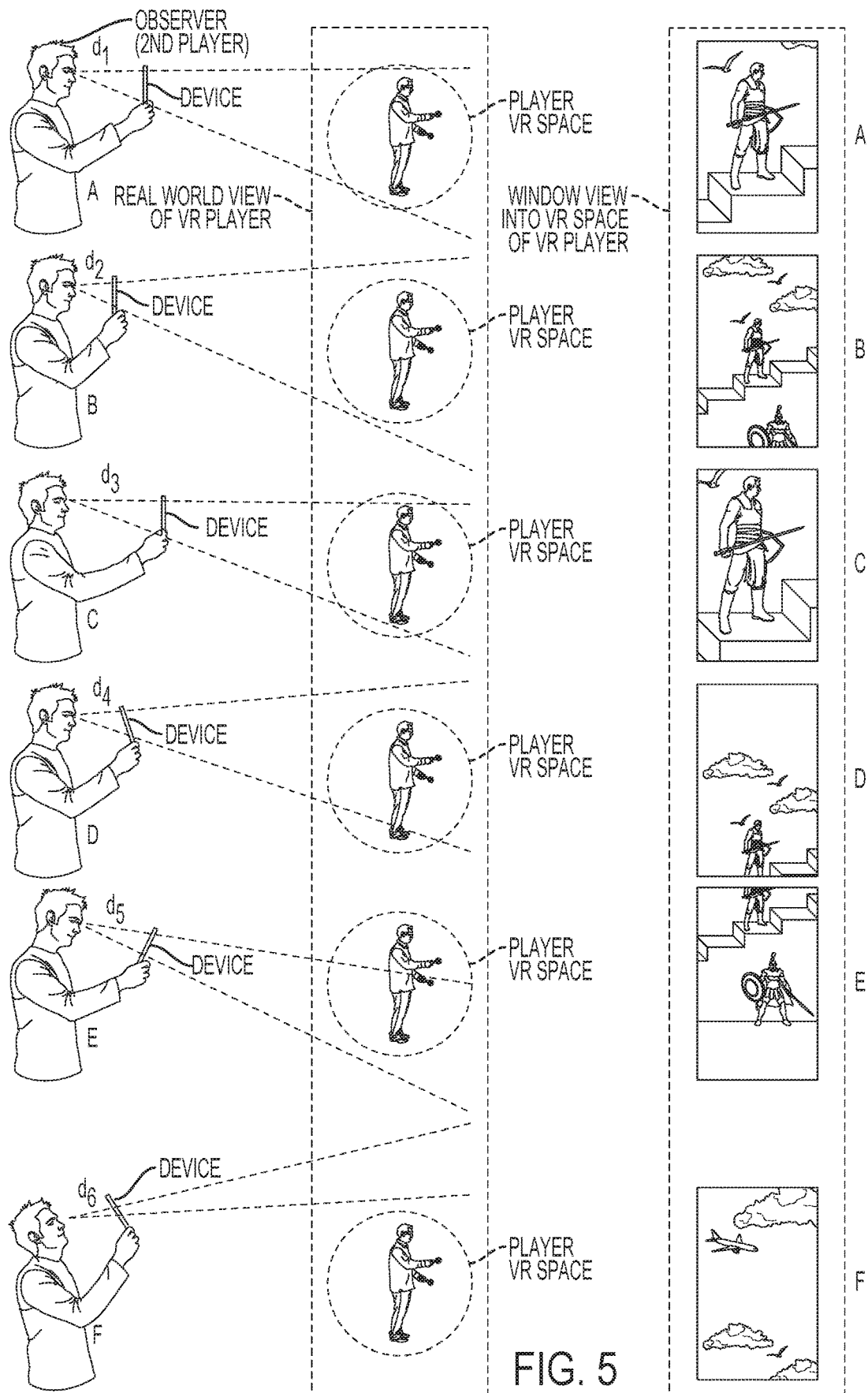
FIG. 5 illustrates an example of tracking the position of the user's device in order to gain different perspectives into the player VR space, and showing different content in the window view into the VR space of the VR player, in accordance with one embodiment.

FIG. 5 illustrates an example of the observer moving the device to different distances d1 through d6, in accordance with one embodiment. The observer can be a second player or additional player. By way of example, the observer can be viewing into the player VR space, and provided a stream of the VR content relative to the way the observer is looking at the VR player. As shown, different positions A-F illustrate how the user can view more or less of the VR space of the VR player through the window view provided to the display of the device of the observer. As noted, the observer can also be a participant or player. The observer can also provide voice feedback to the VR player to avoid certain obstacles, or provide information regarding content that the VR player may not have seen, since the observer may be looking from a different perspective into the same VR space.

In one embodiment, the distances "d" between the face of the user and the handheld device will change, as the user moves the device closer or further from his face. The angel of the handheld device is also monitored, e.g., using inertial sensors or tracking of markers/objects in the real world space captured by the external facing camera of the handheld device. For example, the face and eyes of the user can be tracked using a camera positioned on the user-facing side of the handheld device. This camera is often used for taking selfies, or captures the user's face for video conference calls with others. The images captured of the user's face can be monitored to determine the distance of the handheld device to the user's face. In one embodiment, the distance can be monitored by analyzing multiple frames images of the user's face. For example, if the user's eyes in the images are or become further apart, the camera of the handheld is closer or has moved closer to the user's face. If the eyes in the images change to being closer together, the camera of the handheld is likely moving away from the user's face. In some embodiments, a combination of image analysis and inertial sensor tracking can be used to determine position of the handheld relative to the face of the user.

In some embodiments, depth sensing can also be implemented, wherein the depth is calculated between the user's face and the position of the handheld device. In still other embodiments, depth sensing, image analysis and inertial sensor analysis is carried out using sensor fusion, to determine the distance between the handheld and the user's face. As mentioned above, it is also possible to determine the direction and angle at which the handheld device is positioned, relative to the face of the user. In FIG. 5, positions D, E and F show different angles of view being tracked, which allow different views into the virtual world, relative to an environment of the virtual world environment. Still further, the image data being captured by the forward facing camera can be analyzed at about the same time, to determine where the forward facing camera is pointing. As mentioned above, one embodiment enables using markers in a real world space, to track the real position and orientation of the handheld device, relative to said real world space. One way is to use image analysis, to identify objects in the real world, e.g., furniture, buildings, walls, trees, sidewalks, etc. These objects may be used as anchors, to enable determinations of relative movement of the handheld device with respect to said objects.

Figure 8A:
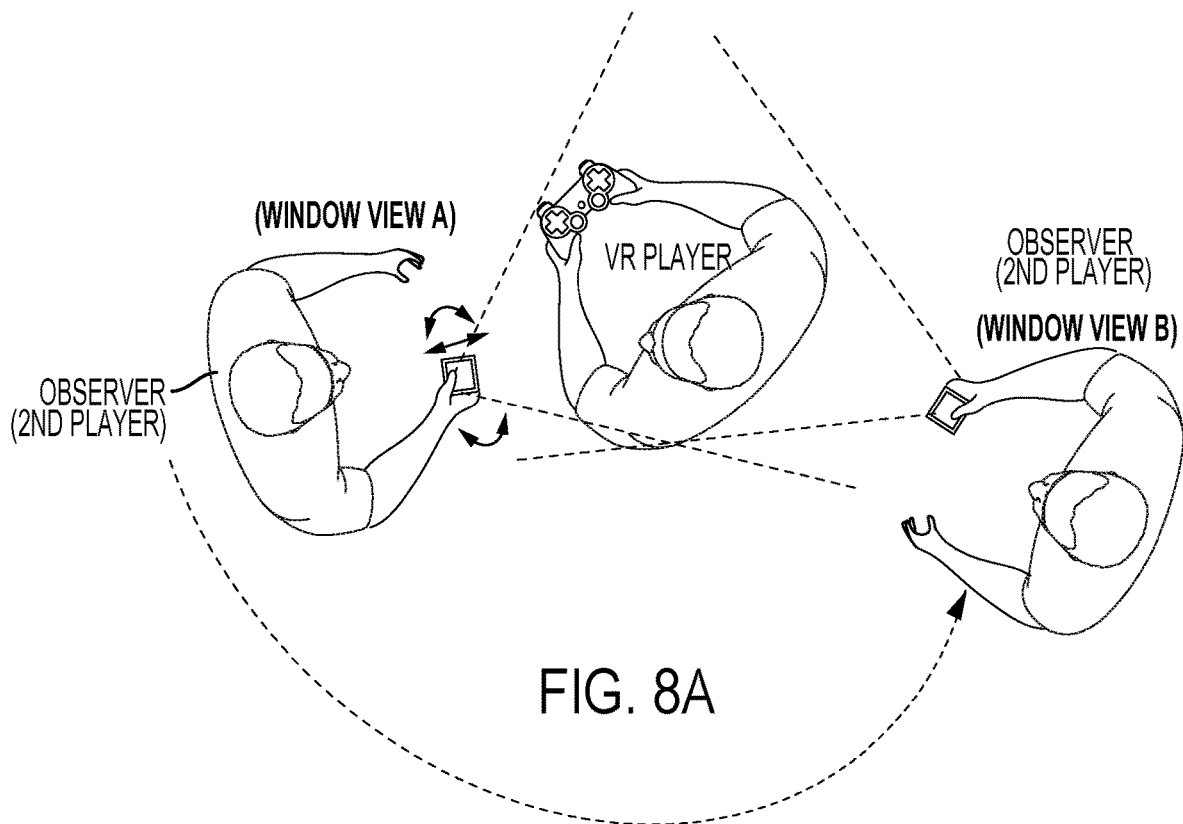
FIG. 8A illustrates an example of the observer changing the window view depending on his position relative to the VR player and the positional location of the device relative to the face of the observer, in accordance with one embodiment.
Figure 8B:
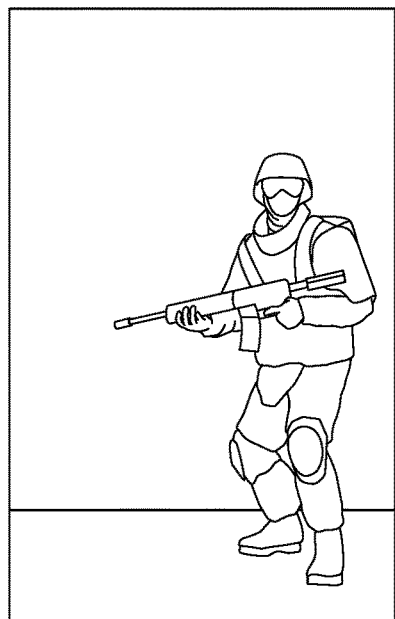
FIGS. 8B and 8C illustrate the changed viewpoints of the window views, relative to the positions taken by the observer of the VR player, while showing the actions by the VR player as a VR character or avatar playing a shooting game, in accordance with one embodiment.

In some embodiments, the position and orientation of the view direction of the forward facing camera is determined relative to a VR player, and his or her view of a virtual reality space. For example, if the handheld device is placed behind the head of the VR player, the view on the screen of the handheld device shown to the observer will show about the same direction view as seen by the VR player. If the handheld device is directed to the front face of the VR player, the view may show the avatar of the VR player in the virtual reality environment, but also may expose the virtual reality space behind the VR player, e.g., as shown in FIGS. 8A-8B. Thus, tracking of the view direction of the handheld device may be relative to objects or tags in the real world space, but also relative to the VR player. In some embodiments, the images captured by the front facing camera of the handheld device may also be analyzed to identify special markers, lights, tags, or shapes (e.g., skeleton outlines of the VR player), to determine what virtual reality space to display in the screen of the handheld device. In some embodiments, the image data captured by the front facing camera may include lights, visible or IR associated with the HMD or controller or clothes or objects held by the VR player or players. It should be understood that tracking of the environment may use sensor fusion, to identify different objects, markers, tags, images, inertial data, to identify position and orientation views into the VR environment being viewed by the VR player or VR user.

In some embodiments, the HMD can directly communicate with the handheld device of the observer. In such examples, the communication can enable exchange of position data of the HMD and/or the handheld device. This exchange of communication can be in a streaming format or periodically when changes are identified or are significant beyond a threshold. The communication exchange can additionally include having the HMD or computer of the HMD directly stream a second video feed of the virtual reality environment. In some embodiments, the video feed is obtained or streamed from a cloud system over a network.

Figure 6A:
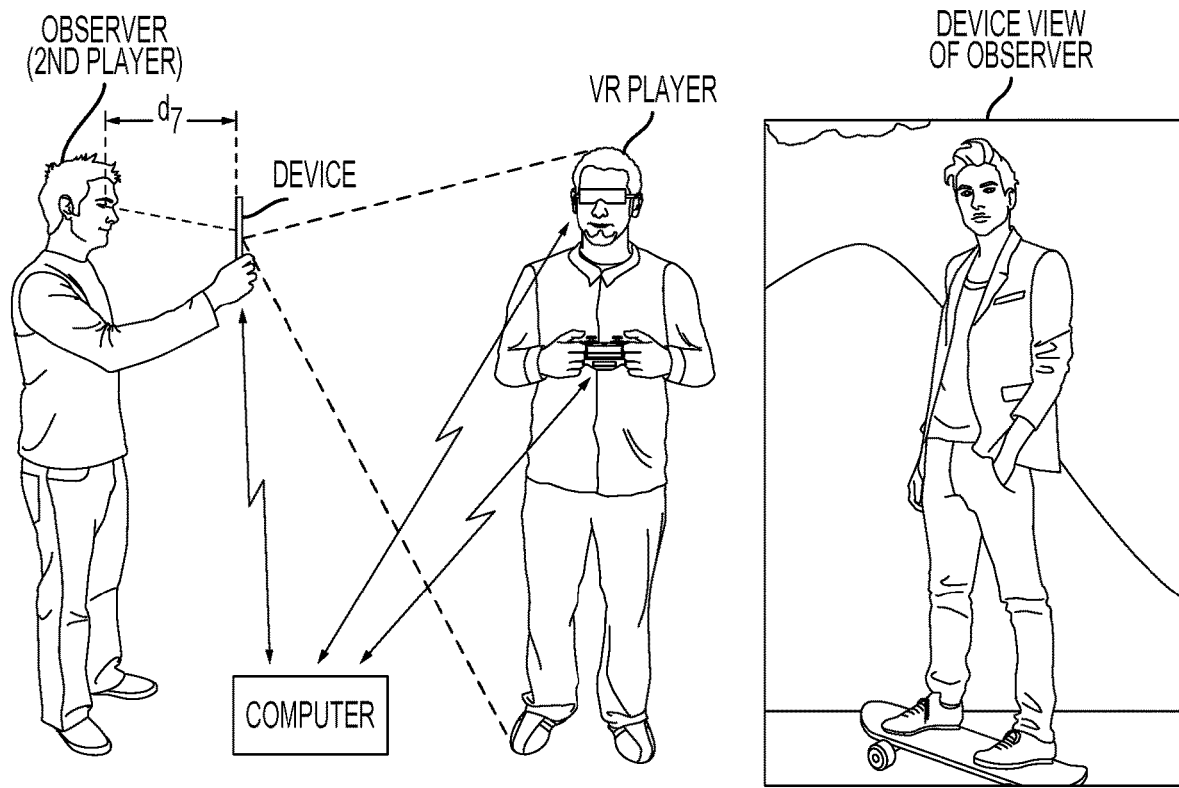
FIG. 6A illustrates an example of an observer utilizing a device to view a VR player, and the VR player is presented in the form of the VR character that the VR player is playing in the screen of the observer, in accordance with one embodiment.
Figure 6B:
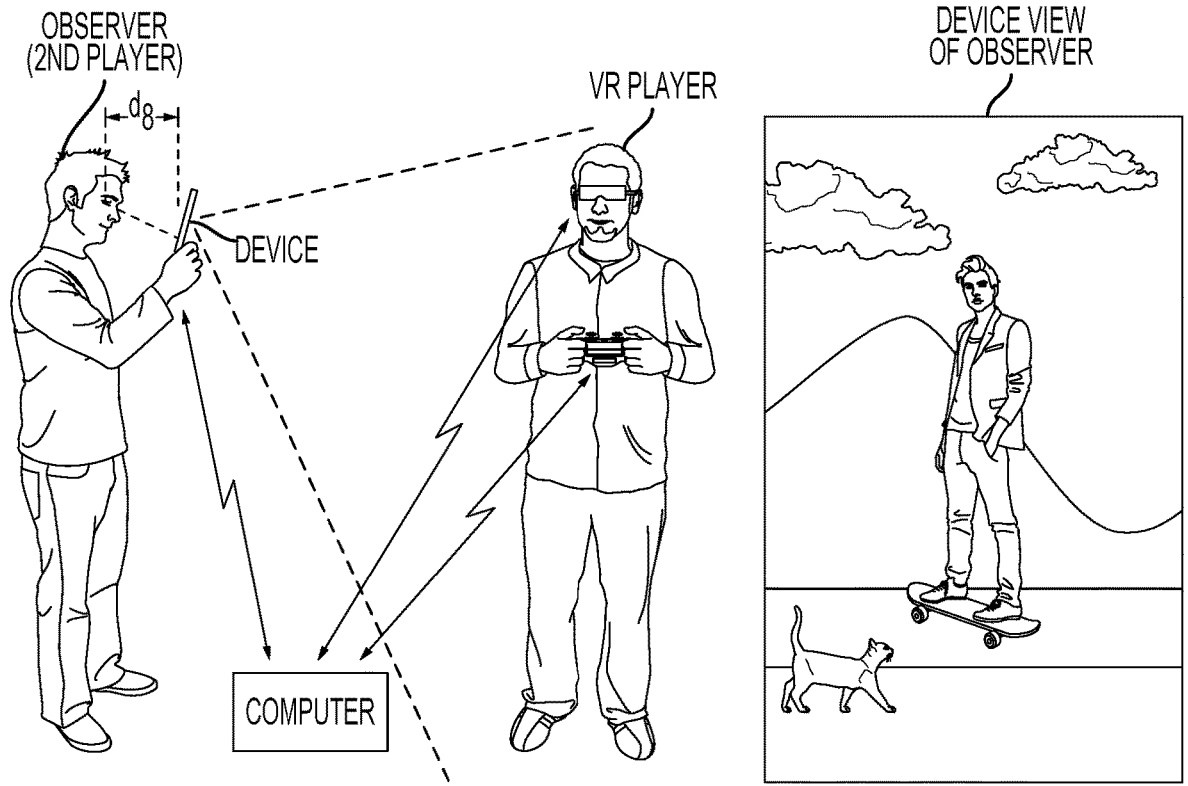
FIG. 6B illustrates an example of the observer moving the device to view the screen from different angles or positions to gain different perspective views into the VR space of the VR player, and therefore modify the view provided by the window effect shown in the device of the observer, in accordance with one embodiment.

FIGS. 6A and 6B illustrate an example where the device is in communication with a computer while the VR player or headset of the VR player is also in communication with the computer. If the VR player is utilizing a peripheral device, the peripheral device may also be in communication with the computer. This example shows that the observer is holding the device at a distance d7 in FIG. 6A. this position of the device will provide a view into the VR space of the VR player, referred to herein as the window view. If the user want to look to the left or to the right of the VR player, the user can simply move the device to the left or to the right or move his eyes to the right relative to the screen to view to the left, or move his eyes to the left relative to the screen to view to the right into the VR space. The window effect therefore provides a view frustum perspective into the VR space, which can be changed by modifying the position of the eyes of the observer relative to the device. In one embodiment, the computer will be able to generate a stream of the VR content that is augmented or modified so that is provided relative to the viewing direction of the VR player in the VR space.

As such, a slightly different view is provided by the image stream provided to the device of the observer than that being provided to the VR player. In one embodiment, the device is provided access to view the VR player in the VR scene, but will follow the VR player into different areas of the VR game. By way of example, the VR player will be considered the primary player, which can control the different VR spaces that are being entered or interacted with. The observer is, in one embodiment, tethered to the VR player, will still be provided with a window view in and around the space of the VR player, by way of the stream provided to the device. As shown in FIG. 6B, when the user moves the phone to a distance d8, and also angles the phone, that position will show different content below the VR player, such as the skateboard being written by the VR player in the VR scene. This content was not viewable by the original position shown in FIG. 6A. As such, the user can freely move around the device and change the relative position of the device to the user's eyes to gain different window views into the VR space. In some embodiments, the VR player may also be provided a view to the outside world. By way of example, the view provided to the VR player of the outside world (real world) may be a window-like video. In one embodiment, the HMD may be provided with one or more external cameras, or one or more cameras with a wide angle camera, or camera on the gimbal, or multiple cameras to capture different viewpoints from the VR player's perspective.

Figure 7:
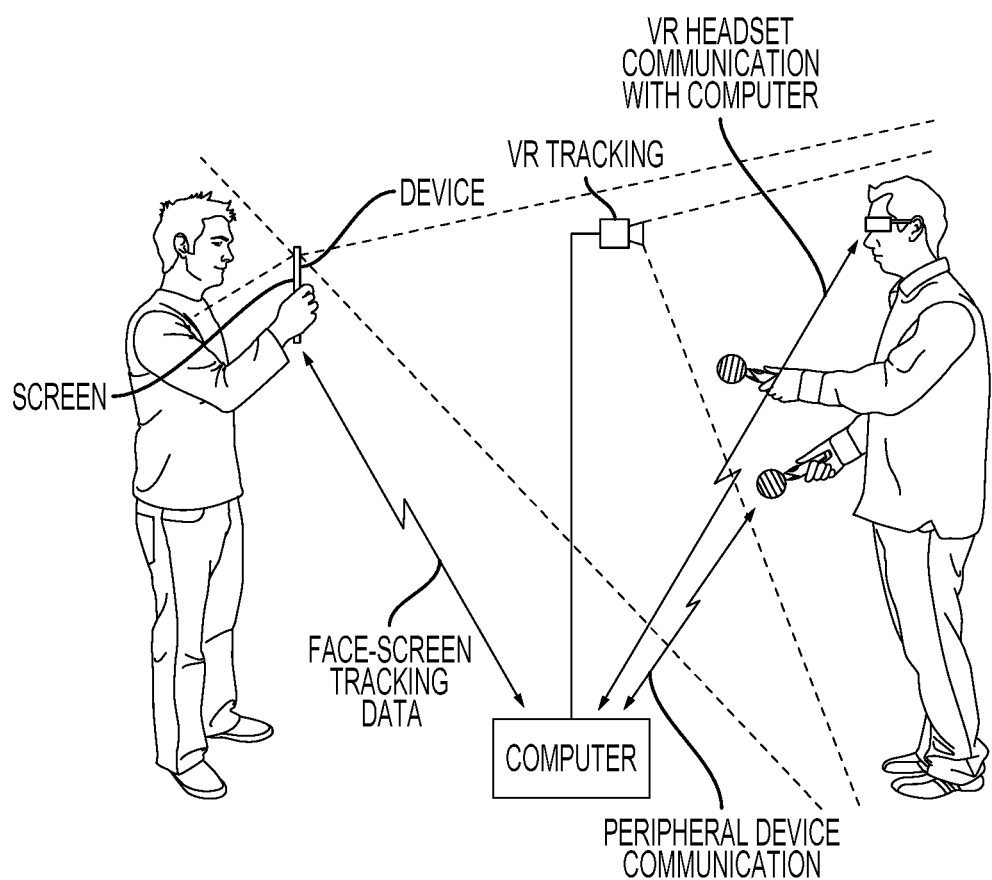
FIG. 7 illustrates an example of the observer utilizing a device to view a VR player, and showing the communication by the device with the computer and the computer with the VR headset and peripheral devices, so that the computer can share and produce a video stream for the device of the observer relative to the positional view of the VR player, in accordance with one embodiment.

FIG. 7 illustrates an example of the computer providing a stream of content to the device relative to the face-screen tracking data provided by the device to the computer, in accordance with one embodiment. The user space is tracked for position of the device relative to the screen, and in one embodiment inertial sensor data of the device can also be transmitted to the computer. By blending and infusing together different tracking data from the device, more precision is provided to the orientation and direction of the device into the VR space as well as the position and orientation relative to the face of the user. In this example, the VR player is utilizing an HMD, which is in communication with the computer. The communication can be wired or wireless. The VR player can also be utilizing peripheral devices that may be in communication with the computer. In some embodiments, the computer is a PC computer that is processing virtual-reality content and generating a stream of video and audio to the HMD. In addition, the PC computer can be generating a second stream of video and audio to the device of the observer. The second stream can be augmented or different from the stream provided to the HMD, based on the positional location of the device looking at the VR player.

FIG. 8A illustrates an example of an overhead view of a VR player and an observer moving around to look at the VR player from different angles. Therefore, in addition to being able to move the device by the observer closer or further from the user's face to get different viewing windows and window effects into the VR space of the VR player, different perspectives can also be provided.

Figure 8C:
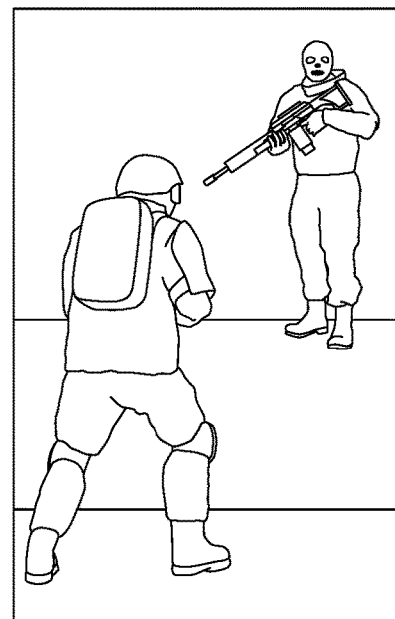

FIGS. 8B and 8C illustrate the example of a window view A and a window view B, relative to the different positions of the observer viewing the VR player. As shown on the screen of the device of the observer, the VR player is portrayed as he is in the VR space plane a VR game. From one view, the front face of the VR player is shown, but another character is not shown from that view. When the observer moves behind the VR player, the other player battling the VR player is shown. Thus, by moving around in the space while viewing the VR player, it is possible to see different content but also adjust the content with the window view effect, so as to provide more angles and perspectives into the VR space, based on the track position of the observer space relative to the device.

Figure 9:
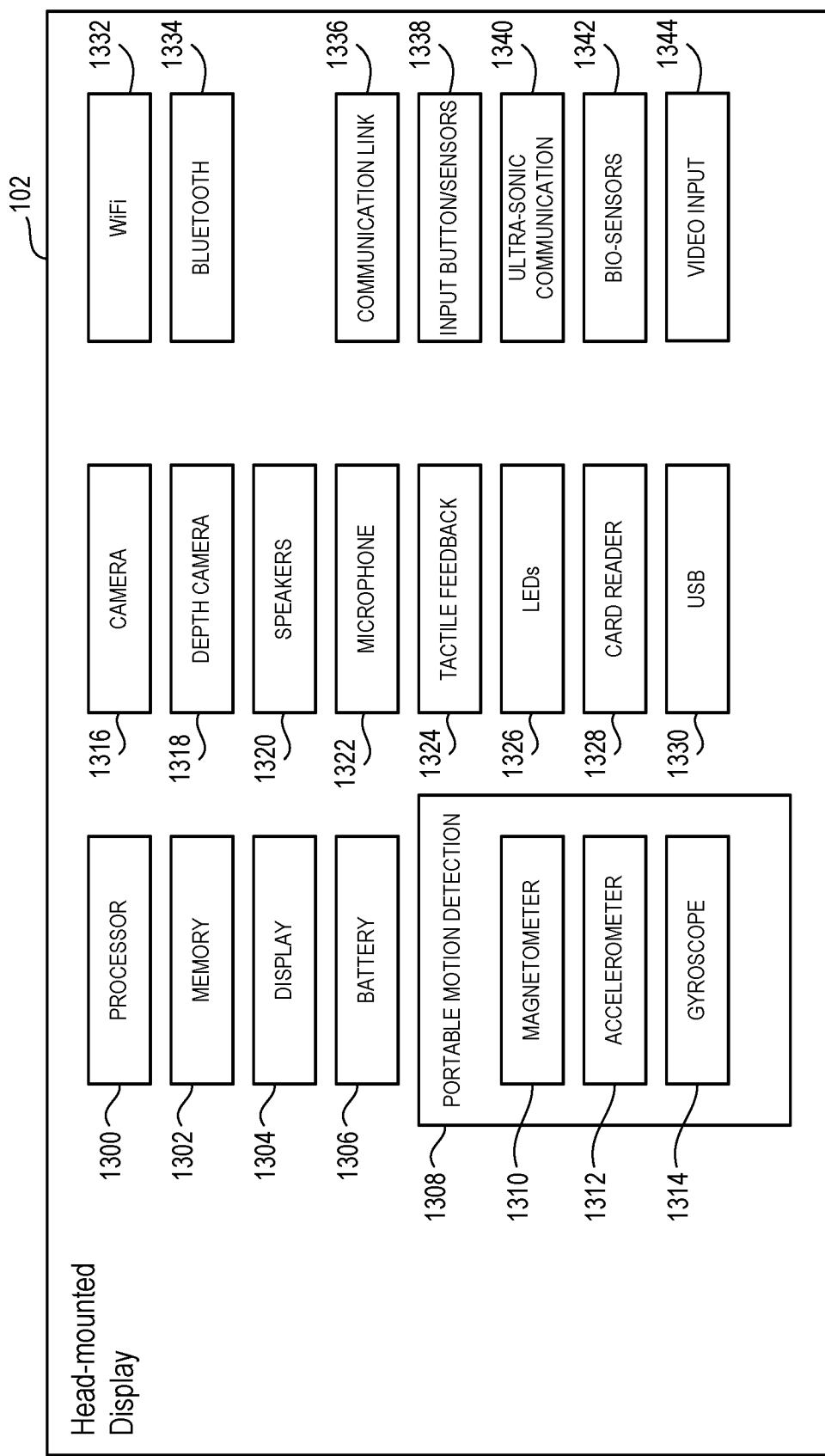
FIG. 9 illustrates components of a head-mounted display, in accordance with an embodiment of the disclosure.

With reference to FIG. 9, a diagram illustrating components of a head-mounted display 102 is shown, in accordance with an embodiment of the disclosure. The head-mounted display 102 includes a processor 1300 for executing program instructions. A memory 1302 is provided for storage purposes, and may include both volatile and non-volatile memory. A display 1304 is included which provides a visual interface that a user may view. A battery 1306 is provided as a power source for the head-mounted display 102. A motion detection module 1308 may include any of various kinds of motion sensitive hardware, such as a magnetometer 1310, an accelerometer 1312, and a gyroscope 1314.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1312 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 1310 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 1312 is used together with magnetometer 1310 to obtain the inclination and azimuth of the head-mounted display 102.

In some implementations, the magnetometers of the head-mounted display are configured so as to be read during times when electromagnets in other nearby devices are inactive.

A gyroscope is a device for measuring or maintaining orientation, based on the principles of angular momentum. In one embodiment, three gyroscopes 1314 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1316 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 1318 may be included in the head-mounted display 102 for sensing depth information of objects in a real environment.

The head-mounted display 102 includes speakers 1320 for providing audio output. Also, a microphone 1322 may be included for capturing audio from the real environment, including sounds from the ambient environment, speech made by the user, etc. The head-mounted display 102 includes tactile feedback module 1324 for providing tactile feedback to the user. In one embodiment, the tactile feedback module 1324 is capable of causing movement and/or vibration of the head-mounted display 102 so as to provide tactile feedback to the user.

LEDs 1326 are provided as visual indicators of statuses of the head-mounted display 102. For example, an LED may indicate battery level, power on, etc. A card reader 1328 is provided to enable the head-mounted display 102 to read and write information to and from a memory card. A USB interface 1330 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A WiFi module 1332 is included for enabling connection to the Internet or a local area network via wireless networking technologies. Also, the head-mounted display 102 includes a Bluetooth module 1334 for enabling wireless connection to other devices. A communications link 1336 may also be included for connection to other devices. In one embodiment, the communications link 1336 utilizes infrared transmission for wireless communication. In other embodiments, the communications link 1336 may utilize any of various wireless or wired transmission protocols for communication with other devices.

Input buttons/sensors 1338 are included to provide an input interface for the user. Any of various kinds of input interfaces may be included, such as buttons, touchpad, joystick, trackball, etc. An ultra-sonic communication module 1340 may be included in head-mounted display 102 for facilitating communication with other devices via ultrasonic technologies.

Bio-sensors 1342 are included to enable detection of physiological data from a user. In one embodiment, the bio-sensors 1342 include one or more dry electrodes for detecting bio-electric signals of the user through the user's skin.

A video input 1344 is configured to receive a video signal from a primary processing computer (e.g. main game console) for rendering on the HMD. In some implementations, the video input is an HDMI input.

The foregoing components of head-mounted display 102 have been described as merely exemplary components that may be included in head-mounted display 102. In various embodiments of the disclosure, the head-mounted display 102 may or may not include some of the various aforementioned components. Embodiments of the head-mounted display 102 may additionally include other components not presently described, but known in the art, for purposes of facilitating aspects of the present disclosure as herein described.

Figure 10:
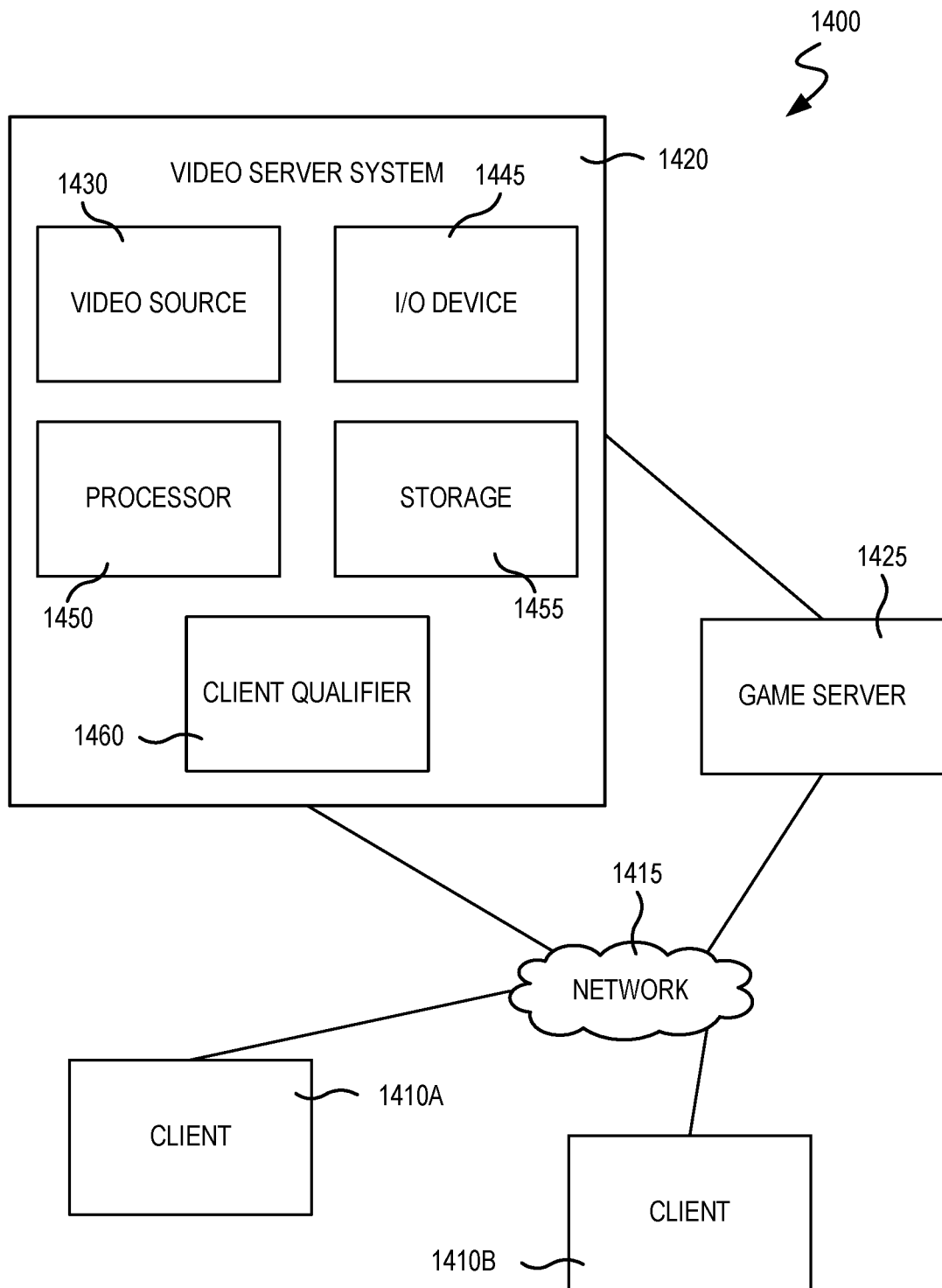
FIG. 10 is a block diagram of a Game System 1400, according to various embodiments of the disclosure.

FIG. 10 is a block diagram of a Game System 1400, according to various embodiments of the disclosure. Game System 1400 is configured to provide a video stream to one or more Clients 1410 via a Network 1415. Game System 1400 typically includes a Video Server System 1420 and an optional game server 1425. Video Server System 1420 is configured to provide the video stream to the one or more Clients 1410 with a minimal quality of service. For example, Video Server System 1420 may receive a game command that changes the state of or a point of view within a video game, and provide Clients 1410 with an updated video stream reflecting this change in state with minimal lag time. The Video Server System 1420 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative embodiments of the disclosure.

Clients 1410, referred to herein individually as 1410A, 1410B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1410 are configured to receive encoded video streams, decode the video streams, and present the resulting video to a user, e.g., a player of a game. The processes of receiving encoded video streams and/or decoding the video streams typically includes storing individual video frames in a receive buffer of the Client. The video streams may be presented to the user on a display integral to Client 1410 or on a separate device such as a monitor or television. Clients 1410 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1410 are optionally geographically dispersed. The number of clients included in Game System 1400 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1420 to deliver a game viewed through the HMD. In one embodiment, the game console receives the video stream from the video server system 1420, and the game console forwards the video stream, or updates to the video stream, to the HMD for rendering.

Clients 1410 are configured to receive video streams via Network 1415. Network 1415 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1410 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1410 may, but are not required to, further include systems configured for modifying received video. For example, a Client may be configured to perform further rendering, to overlay one video image on another video image, to crop a video image, and/or the like. For example, Clients 1410 may be configured to receive various types of video frames, such as I-frames, P-frames and B-frames, and to process these frames into images for display to a user. In some embodiments, a member of Clients 1410 is configured to perform further rendering, shading, conversion to 3-D, or like operations on the video stream. A member of Clients 1410 is optionally configured to receive more than one audio or video stream. Input devices of Clients 1410 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1410 is generated and provided by Video Server System 1420. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1410 are typically configured to receive inputs from a user. These inputs may include game commands configured to change the state of the video game or otherwise affect game play. The game commands can be received using input devices and/or may be automatically generated by computing instructions executing on Clients 1410. The received game commands are communicated from Clients 1410 via Network 1415 to Video Server System 1420 and/or Game Server 1425. For example, in some embodiments, the game commands are communicated to Game Server 1425 via Video Server System 1420. In some embodiments, separate copies of the game commands are communicated from Clients 1410 to Game Server 1425 and Video Server System 1420. The communication of game commands is optionally dependent on the identity of the command Game commands are optionally communicated from Client 1410A through a different route or communication channel that that used to provide audio or video streams to Client 1410A.

Game Server 1425 is optionally operated by a different entity than Video Server System 1420. For example, Game Server 1425 may be operated by the publisher of a multiplayer game. In this example, Video Server System 1420 is optionally viewed as a client by Game Server 1425 and optionally configured to appear from the point of view of Game Server 1425 to be a prior art client executing a prior art game engine. Communication between Video Server System 1420 and Game Server 1425 optionally occurs via Network 1415. As such, Game Server 1425 can be a prior art multiplayer game server that sends game state information to multiple clients, one of which is game server system 1420. Video Server System 1420 may be configured to communicate with multiple instances of Game Server 1425 at the same time. For example, Video Server System 1420 can be configured to provide a plurality of different video games to different users. Each of these different video games may be supported by a different Game Server 1425 and/or published by different entities. In some embodiments, several geographically distributed instances of Video Server System 1420 are configured to provide game video to a plurality of different users. Each of these instances of Video Server System 1420 may be in communication with the same instance of Game Server 1425. Communication between Video Server System 1420 and one or more Game Server 1425 optionally occurs via a dedicated communication channel. For example, Video Server System 1420 may be connected to Game Server 1425 via a high bandwidth channel that is dedicated to communication between these two systems.

Video Server System 1420 comprises at least a Video Source 1430, an I/O Device 1445, a Processor 1450, and non-transitory Storage 1455. Video Server System 1420 may include one computing device or be distributed among a plurality of computing devices. These computing devices are optionally connected via a communications system such as a local area network.

Video Source 1430 is configured to provide a video stream, e.g., streaming video or a series of video frames that form a moving picture. In some embodiments, Video Source 1430 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1425. Game Server 1425 may maintain a copy of the state of the game based on game commands received from multiple players using geographically disperse clients. In these cases, the game state is provided by Game Server 1425 to Video Source 1430, wherein a copy of the game state is stored and rendering is performed. Game Server 1425 may receive game commands directly from Clients 1410 via Network 1415, and/or may receive game commands via Video Server System 1420.

Video Source 1430 typically includes rendering logic, e.g., hardware, firmware, and/or software stored on a computer readable medium such as Storage 1455. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1410. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and an "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1430 includes a video recording device such as a camera. This camera may be used to generate delayed or live video that can be included in the video stream of a computer game. The resulting video stream optionally includes both rendered images and images recorded using a still or video camera. Video Source 1430 may also include storage devices configured to store previously recorded video to be included in a video stream. Video Source 1430 may also include motion or positioning sensing devices configured to detect motion or position of an object, e.g., person, and logic configured to determine a game state or produce video-based on the detected motion and/or position.

Video Source 1430 is optionally configured to provide overlays configured to be placed on other video. For example, these overlays may include a command interface, log in instructions, messages to a game player, images of other game players, video feeds of other game players (e.g., webcam video). In embodiments of Client 1410A including a touch screen interface or a gaze detection interface, the overlay may include a virtual keyboard, joystick, touch pad, and/or the like. In one example of an overlay a player's voice is overlaid on an audio stream. Video Source 1430 optionally further includes one or more audio sources.

In embodiments wherein Video Server System 1420 is configured to maintain the game state based on input from more than one player, each player may have a different point of view comprising a position and direction of view. Video Source 1430 is optionally configured to provide a separate video stream for each player based on their point of view. Further, Video Source 1430 may be configured to provide a different frame size, frame data size, and/or encoding to each of Client 1410. Video Source 1430 is optionally configured to provide 3-D video.

I/O Device 1445 is configured for Video Server System 1420 to send and/or receive information such as video, commands, requests for information, a game state, gaze information, device motion, device location, user motion, client identities, player identities, game commands, security information, audio, and/or the like. I/O Device 1445 typically includes communication hardware such as a network card or modem. I/O Device 1445 is configured to communicate with Game Server 1425, Network 1415, and/or Clients 1410.

Processor 1450 is configured to execute logic, e.g. software, included within the various components of Video Server System 1420 discussed herein. For example, Processor 1450 may be programmed with software instructions in order to perform the functions of Video Source 1430, Game Server 1425, and/or a Client Qualifier 1460. Video Server System 1420 optionally includes more than one instance of Processor 1450. Processor 1450 may also be programmed with software instructions in order to execute commands received by Video Server System 1420, or to coordinate the operation of the various elements of Game System 1400 discussed herein. Processor 1450 may include one or more hardware device. Processor 1450 is an electronic processor.

Storage 1455 includes non-transitory analog and/or digital storage devices. For example, Storage 1455 may include an analog storage device configured to store video frames. Storage 1455 may include a computer readable digital storage, e.g. a hard drive, an optical drive, or solid state storage. Storage 1415 is configured (e.g. by way of an appropriate data structure or file system) to store video frames, artificial frames, a video stream including both video frames and artificial frames, audio frame, an audio stream, and/or the like. Storage 1455 is optionally distributed among a plurality of devices. In some embodiments, Storage 1455 is configured to store the software components of Video Source 1430 discussed elsewhere herein. These components may be stored in a format ready to be provisioned when needed.

Video Server System 1420 optionally further comprises Client Qualifier 1460. Client Qualifier 1460 is configured for remotely determining the capabilities of a client, such as Clients 1410A or 1410B. These capabilities can include both the capabilities of Client 1410A itself as well as the capabilities of one or more communication channels between Client 1410A and Video Server System 1420. For example, Client Qualifier 1460 may be configured to test a communication channel through Network 1415.

Client Qualifier 1460 can determine (e.g., discover) the capabilities of Client 1410A manually or automatically. Manual determination includes communicating with a user of Client 1410A and asking the user to provide capabilities. For example, in some embodiments, Client Qualifier 1460 is configured to display images, text, and/or the like within a browser of Client 1410A. In one embodiment, Client 1410A is an HMD that includes a browser. In another embodiment, client 1410A is a game console having a browser, which may be displayed on the HMD. The displayed objects request that the user enter information such as operating system, processor, video decoder type, type of network connection, display resolution, etc. of Client 1410A. The information entered by the user is communicated back to Client Qualifier 1460.

Automatic determination may occur, for example, by execution of an agent on Client 1410A and/or by sending test video to Client 1410A. The agent may comprise computing instructions, such as java script, embedded in a web page or installed as an add-on. The agent is optionally provided by Client Qualifier 1460. In various embodiments, the agent can find out processing power of Client 1410A, decoding and display capabilities of Client 1410A, lag time reliability and bandwidth of communication channels between Client 1410A and Video Server System 1420, a display type of Client 1410A, firewalls present on Client 1410A, hardware of Client 1410A, software executing on Client 1410A, registry entries within Client 1410A, and/or the like.

Client Qualifier 1460 includes hardware, firmware, and/or software stored on a computer readable medium. Client Qualifier 1460 is optionally disposed on a computing device separate from one or more other elements of Video Server System 1420. For example, in some embodiments, Client Qualifier 1460 is configured to determine the characteristics of communication channels between Clients 1410 and more than one instance of Video Server System 1420. In these embodiments the information discovered by Client Qualifier can be used to determine which instance of Video Server System 1420 is best suited for delivery of streaming video to one of Clients 1410.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In some examples, method operations were described in a specific order, however, it should be understood that other housekeeping operations may be performed in between operations, or operations may be adjusted so that they occur at slightly different times. In some embodiments, the operations may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the present disclosure and appended claims.

What is claimed is:

1. A method for observing a virtual reality environment of a virtual reality player, comprising,
    establishing, by a handheld device of an observer, a connection with a computer executing the virtual reality environment being presented to the virtual reality player using a head mounted display (HMD);
    capturing, by a first camera of the handheld device, a current position of the virtual reality player in a real world space;
    capturing, by a second camera of the handheld device, a face position of the observer, the face position being monitored to determine a viewing direction to a screen of the handheld device, the screen of the handheld device is configured to present the virtual reality environment and at least part of the virtual reality player interacting in the virtual reality environment, wherein a current position of the handheld device and the face position of the observer being continually shared with the computer executing the virtual reality environment presented to the virtual reality player; and
    receiving, from the computer, a video stream of the virtual reality environment that includes at least part of the virtual reality player adjusted for the current position of the virtual reality player in the real world and the viewing direction of the observer to the screen of the handheld device.

2. The method of claim 1, wherein the continually shared face position of the observer is used to identify changes in a distance between a face of the observer and the screen.

3. The method of claim 2, further comprising,
    receiving, based on the identified changes in the distance, a zoom-in or zoom-out images in the received video stream of the virtual reality environment.

4. The method of claim 3, wherein said zoom-in is processed when the distance between the face of the observer and the screen increases and said zoom-out is processed when distance between the face of the observer and the screen decreases.

5. The method of claim 1, wherein the current position of the virtual reality player in the real world space is used to identify an HMD viewing direction, the HMD viewing direction is used by the computer to approximate a view being provided to the HMD as controlled by the virtual reality player's use of the HMD.

6. The method of claim 1, wherein eyes of the observer are tracked to determine the viewing direction to the screen of the handheld device, the eyes being tracked for gaze using the second camera of the handheld device.

7. The method of claim 1, wherein movement of the handheld device by the observer around the virtual reality player causes updates to views provided by the video stream presented on the screen of the handheld device.

8. The method of claim 7, wherein said updates to views enable a 360 degree view around the virtual reality environment, and wherein said movement enables viewing areas of the virtual reality environment that excludes the virtual reality player.

9. The method of claim 1, wherein the virtual reality player is rendered in the virtual reality environment as a character that interacts with the virtual reality environment.

10. The method of claim 1, wherein said continually sharing is enabled via said connection, the connection being a wireless connection that is configured to send a stream of images captured using the first camera and the second camera of the handheld device to the computer.

11. The method of claim 10, wherein said computer is configured to analyze the stream of images to identify the current position of the virtual reality player in the real world space relative to the current position of the handheld device, such that the video stream provided to the screen of the handheld device enables viewing into the virtual environment presented using the HMD, such that the viewing into the virtual reality environment via the handheld device is controlled by movement of the handheld device and viewing into virtual reality environment via the HMD is controlled independently by movement of the HMD by the virtual reality player.

12. The method of claim 1, wherein movement of the handheld device by the observer enables viewing above, below and around virtual reality player as depicted in the virtual reality environment.

13. The method of claim 1, wherein movement of the handheld device is relative to the current position of the virtual reality player in the real world space, the movement of the handheld device enables viewing objects in the virtual reality environment in a pan-out view when the handheld device is moved closer a face of the observer and a pan-in view when the handheld device is moved away from the face of the observer.

14. A method for observing a virtual reality environment of a virtual reality player, comprising,
  executing the virtual reality environment via a computer;
  establishing a connection between the computer and a handheld device of an observer, the virtual reality environment being presented to the virtual reality player using a head mounted display (HMD);
  receiving image data for identifying a first position of the virtual reality player in a real world space, the image data being captured by a first camera of the handheld device;
  receiving image data for identifying a face position of the observer to determine a viewing direction to a screen of the handheld device using a second camera, the screen of the handheld device is configured to present the virtual reality environment and at least part of the virtual reality player interacting in the virtual reality environment, wherein a current position of the handheld device and the face position of the observer being continually received by the computer executing the virtual reality environment presented to the virtual reality player; and
  sending to the handheld device a video stream of the virtual reality environment that includes at least part of the virtual reality player adjusted for the current position of the virtual reality player in the real world and the viewing direction of the observer to the screen of the handheld device.

15. The method of claim 14, wherein the continually received face position of the observer is used to identify changes in a distance between a face of the observer and the screen; and
  sending, based on the identified changes in the distance, zoom-in or zoom-out images for the sent video stream of the virtual reality environment.

16. The method of claim 15, wherein said zoom-in is processed when the distance between the face of the observer and the screen increases and said zoom-out is processed when distance between the face of the observer and the screen decreases.

17. The method of claim 14, wherein the current position of the virtual reality player in the real world space is used to identify an HMD viewing direction, the HMD viewing direction is used by the computer to approximate a view being provided to the HMD as controlled by the virtual reality player's use of the HMD.

18. The method of claim 14, wherein eyes of the observer are tracked to determine the viewing direction to the screen of the handheld device, the eyes being tracked for gaze using the second camera of the handheld device.

19. The method of claim 14, wherein said computer is configured to analyze a stream of images to identify the current position of the virtual reality player in the real world space relative to the current position of the handheld device, such that the video stream provided to the screen of the handheld device enables viewing into the virtual environment presented using the HMD, such that the viewing into the virtual reality environment via the handheld device is controlled by movement of the handheld device and viewing into virtual reality environment via the HMD is controlled independently by movement of the HMD by the virtual reality player.

20. The method of claim 14, wherein the virtual reality player is rendered in the virtual reality environment as a character that interacts with the virtual reality environment, and said continually received is enabled via said connection, the connection being a wireless connection that is configured to receive a stream of images captured using the first camera and the second camera of the handheld device to the computer.

21. The method of claim 14, wherein movement of the handheld device by the observer enables viewing above, below and around virtual reality player as depicted in the virtual reality environment.

22. The method of claim 14, wherein movement of the handheld device by the observer around the virtual reality player causes updates to views of the video stream presented on the screen of the handheld device, and said updates to views enable a 360 degree view around the virtual reality environment, and wherein said movement enables viewing areas of the virtual reality environment that excludes the virtual reality player.

23. The method of claim 14, wherein the movement of the handheld device is relative to the current position of the virtual reality player in the real world space, the movement of the handheld device enables viewing objects in the virtual reality environment in a pan-out view when the handheld device is moved closer a face of the observer and a pan-in view when the handheld device is moved away from the face of the observer.

* * * * *